US007161694B2

(12) United States Patent
Saka et al.

(10) Patent No.: US 7,161,694 B2
(45) Date of Patent: Jan. 9, 2007

(54) IMAGING FORMING APPARATUS, IMAGE FORMING SYSTEM, IMAGE FORMING METHOD, PROGRAM AND STORAGE MEDIUM

(75) Inventors: Masaaki Saka, Toyokawa (JP); Eiichi Yoshida, Toyokawa (JP); Shoji Imaizumi, Shinshiro (JP); Hiroshi Iwamoto, Toyohashi (JP); Hiroshi Sugiura, Hoi-gun (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 204 days.

(21) Appl. No.: 11/024,649

(22) Filed: Dec. 30, 2004

(65) Prior Publication Data

US 2006/0103866 A1 May 18, 2006

(30) Foreign Application Priority Data

Nov. 17, 2004 (JP) ............................. 2004-333289

(51) Int. Cl.
*G06F 15/00* (2006.01)
*G06K 15/00* (2006.01)

(52) U.S. Cl. ...................................... 358/1.13; 358/1.1
(58) Field of Classification Search ................ 358/1.1, 358/1.2, 1.6, 1.9, 1.13, 1.14, 1.15, 504, 530, 358/401, 448, 462
See application file for complete search history.

(56) References Cited

U.S. PATENT DOCUMENTS 4,945,829 A * 8/1990 Ericsson ..................... 101/129
5,762,329 A * 6/1998 Nakazato et al. ......... 270/58.09
6,116,716 A * 9/2000 Tajika et al. .................. 347/19
6,891,649 B1 * 5/2005 Kondo ........................ 358/527
7,072,737 B1 * 7/2006 Lunak et al. ............... 700/236

FOREIGN PATENT DOCUMENTS

JP          9-160321        6/1997

* cited by examiner

*Primary Examiner*—Gabriel Garcia
(74) *Attorney, Agent, or Firm*—Buchanan Ingersoll & Rooney PC

(57) ABSTRACT

An image forming apparatus includes a receiving device which receives an image and first printing conditions for printing the image from a terminal via a network, a generating device which generates second printing conditions on the basis of the first printing conditions and settings of the image forming apparatus, a comparing device which compares the first and second printing conditions to determine whether or not one or more discrepancies occur between them, a first storage device which stores a table which stores discrepancies to be determined to occur and solutions each of which corresponds to each of the discrepancies, a first setting device which automatically sets, by using the table, a solution among the solutions for each of the discrepancies determined to occur, and a printing device which prints the image on printing conditions in which the one or more discrepancies are solved by the set solution.

19 Claims, 18 Drawing Sheets

Fig.3

| | | SOLUTIONS FOR DISCREPANCIES |
|---|---|---|
| saka | A (MOST SIGNIFICANT) | • TURN SHEETS OF PAPER TO MATCH THE LOCATION OF STABLING OR PUNCHING ON THE SHEETS OF PAPER TO THAT SPECIFIED BY A PRINT JOB<br>• SELECT OTHER PAPER FEED TRAY CONTAINING SHEETS OF PAPER OF THE SIZE AND TYPE SPECIFIED BY A PRINT JOB |
| | B (SIGNIFICANT) | • SELECT OTHER PAPER FEED TRAY CONTAINING SHEETS OF PAPER OF THE SIZE SPECIFIED BY A PRINT JOB |
| | C (NOT SIGNIFICANT) | • PRINT ON A PRINTING CONDITION GENERATED BY AN IMAGE FORMING APPARATUS |
| suzuki | A (MOST SIGNIFICANT) | • TURN SHEETS OF PAPER TO MATCH THE LOCATION OF STABLING OR PUNCHING ON THE SHEETS TO THAT SPECIFIED BY A PRINT JOB<br>• SELECT OTHER PAPER FEED TRAY CONTAINING SHEETS OF PAPER OF THE SIZE AND TYPE SPECIFIED BY A PRINT JOB |
| | B (SIGNIFICANT) | • SELECT OTHER PAPER FEED TRAY CONTAINING SHEETS OF PAPER OF THE SIZE AND TYPE SPECIFIED BY A PRINT JOB |
| | C (NOT SIGNIFICANT) | • SELECT OTHER PAPER FEED TRAY CONTAINING SHEETS OF PAPER OF THE SIZE SPECIFIED BY A PRINT JOB |

Fig.4

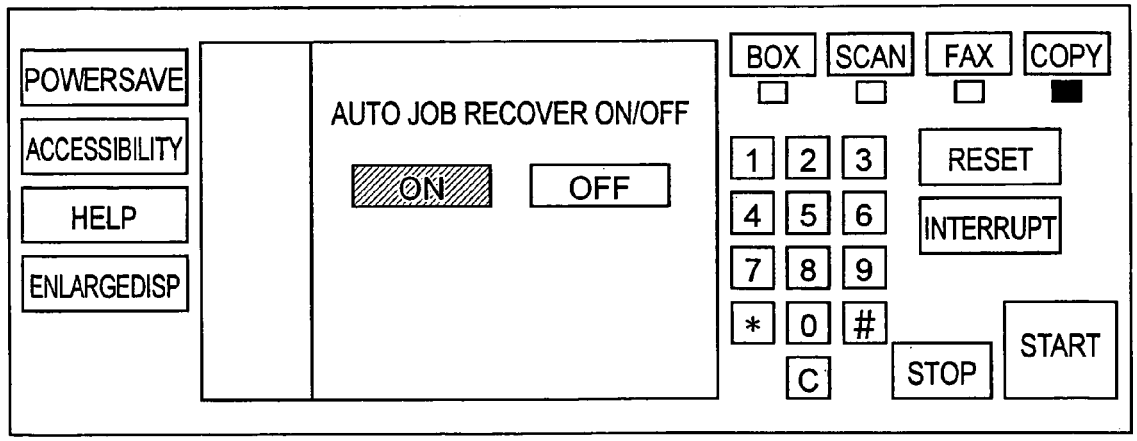

IMAGING FORMING APPARATUS, IMAGE FORMING SYSTEM, IMAGE FORMING METHOD, PROGRAM AND STORAGE MEDIUM

This application is based on Japanese Patent Application No. 2004-333289 filed in Japan on Nov. 17, 2004, the contents of which are hereby incorporated by reference.

BACKGROUND OF THE INVENTION

1. Field of the Invention

The present invention relates to an image forming apparatus, image forming system, image forming method, program and storage medium.

2. Description of the Related Art

As a variety of image forming apparatuses including a copier, a printer, a facsimile, a scanner, and a Multiple Function Peripheral (referred to as "MFP" hereinafter) have been proposed and marketed. Further, an image forming system is provided for a wide range of applications where such an image forming apparatus and a terminal, which controls the image forming apparatus, are connected with each other via a local area network (referred to as "LAN" hereinafter), for example.

When an image is printed in such an image forming system, the image and a print job are sent from the terminal to the image forming apparatus over the network. Upon receiving them, the image forming apparatus starts to make a print on the conditions specified by the received printing job. The print job may specify the size of printing paper, the type of printing paper, for example, OHP or cardboard, the location of stapling or punching on printing paper, and a paper feed tray to be used for printing in an image forming apparatus, and so on.

In such a conventional image forming system, there may occur a discrepancy between the printing conditions (referred to as "first printing conditions" hereinafter) specified by the print job and the printing conditions (referred to as "second printing conditions" hereinafter) which the image forming apparatus generates on the basis of the first printing conditions and settings of the image forming apparatus. More particularly, the size of the printing paper contained in the paper feed tray of the image forming apparatus which the print job specifies may be different from that of the printing paper specified by the print job, the type of the printing paper contained in the paper feed tray specified by the print job may be different from that of the printing paper specified by the print job, and the location of stapling or punching on the printing paper contained in the paper feed tray specified by the print job may be different from that of stapling or punching on the printing paper specified by the print job, for example.

For the conventional system, in the above mentioned cases, an error message indicating the discrepancy is sent from the image forming apparatus to the terminal, and is displayed on a display of the terminal to inform a user of the occurrence of the discrepancy. In response to the error message, the user can reset the print job, replace the sheets of paper contained in the paper feed tray of the image forming apparatus with another sheets of paper, or turn the sheets of paper therein to the position which the user desires, in order to solve the discrepancy.

For example, some conventional facsimile apparatuses have a modifying device which modifies the settings predetermined for sheet of paper received from the image forming apparatus in order to inhibit the stapling together of sheets of paper including a sheet of paper punched in different manner from the other sheets of paper (e.g. Japanese Patent Laid-open Publication No. 9-160321).

However, it is very troublesome for the user to reset the print job or go to the image forming apparatus and replace the sheets of paper, contained in the paper feed tray of the image forming apparatus, with another sheets of paper.

SUMMARY OF THE INVENTION

It is therefore an object of the present invention is to provide an image forming apparatus, an image forming system, an image forming method, program and storage medium which make it possible to solve smoothly a discrepancy between the printing conditions set by a user and the printing conditions set in the image forming apparatus to continue printing process, when the discrepancy has occurs.

According to a first aspect of the present invention, an image forming apparatus, connected with terminals via a network, includes a receiving device which receives an image and first printing conditions for printing the image from a terminal among the terminals via the network, a generating device which generates second printing conditions on the basis of the first printing conditions and settings of the image forming apparatus, a comparing device which compares the first and second printing conditions to determine whether or not one or more discrepancies occur between the first and second printing conditions, a first storage device which stores a table which stores discrepancies to be determined to occur by the comparing device and solutions each of which corresponds to each of the discrepancies, a first setting device which automatically sets, by using the table, a solution among the solutions for each of the one or more discrepancies determined to occur by the comparing device, and a printing device which prints the image on printing conditions in which the one or more discrepancies are solved by the solution set by the first setting device.

According to a second aspect of the present invention, an image forming system includes a terminal, and an image forming apparatus connected to the terminal via a network, wherein the terminal has a sending device which sends an image and first printing conditions for printing the image to the image forming apparatus via the network, the image forming apparatuses has a receiving device which receives the image and the first printing conditions from the terminal via the network, a generating device which generates second printing conditions on the basis of the first printing conditions and settings of the image forming apparatus, a comparing device which compares the first and second printing conditions to determine whether or not one or more discrepancies occur between the first and second printing conditions, a storage device which stores a table which stores discrepancies to be determined to occur by the comparing device and solutions each of which corresponds to each of the discrepancies, a setting device which automatically sets, by using the table, a solution among the solutions for each of the one or more discrepancies determined to occur by the comparing device, and a printing device which prints the image on printing conditions in which the one or more discrepancies are solved by the solution set by the first setting device.

According to a third aspect of the present invention, an image forming method for forming an image at an image forming apparatus connected to terminals via a network, includes storing a table in a storage device which stores discrepancies to occur between two printing conditions set to the image and solutions each of which corresponds to each of the discrepancies, receiving the image and first printing conditions, which is one of the two printing conditions, from one among the terminals via the network, generating second printing conditions, which is another of the two printing conditions, on the basis of the first printing conditions and settings of the image forming apparatus, comparing the first and second printing conditions to determine whether or not one or more discrepancies occur between the first and second printing conditions, setting automatically, by using the table, a solution among the solutions for each of the one or more discrepancies determined to occur by the comparing device, and printing the image on printing conditions in which the one or more discrepancies are solved by the solution set in the setting step.

According to a fourth aspect of the present invention, a program executed by an image forming apparatus for forming an image includes storing a table in a storage device which stores discrepancies to occur between two printing conditions set to the image and solutions each of which corresponds to each of the discrepancies, receiving the image and first printing conditions, which is one of the two printing conditions, from one among the terminals via the network, generating second printing conditions, which is another of the two printing conditions, on the basis of the first printing conditions and settings of the image forming apparatus, comparing the first and second printing conditions to determine whether or not one or more discrepancies occur between the first and second printing conditions, setting automatically, by using the table, a solution among the solutions for each of the one or more discrepancies determined to occur by the comparing device, and printing the image on printing conditions in which the one or more discrepancies are solved by the solution set in the setting step.

According to a fifth aspect of the present invention, a computer-readable storage medium which storages a program executed by an image forming apparatus for forming an image includes storing a table in a storage device which stores discrepancies to occur between two printing conditions set to the image and solutions each of which corresponds to each of the discrepancies, receiving the image and first printing conditions, which is one of the two printing conditions, from one among the terminals via the network, generating second printing conditions, which is another of the two printing conditions, on the basis of the first printing conditions and settings of the image forming apparatus, comparing the first and second printing conditions to determine whether or not one or more discrepancies occur between the first and second printing conditions, setting automatically, by using the table, a solution among the solutions for each of the one or more discrepancies determined to occur by the comparing device, and printing the image on printing conditions in which the one or more discrepancies are solved by the solution set in the setting step.

An advantage of the image forming apparatus, image forming system, image forming method, program and storage medium according to the present invention is that each of them makes it possible to solve smoothly a discrepancy between the printing conditions set by a user and the printing conditions set in the image forming apparatus to continue printing, when the discrepancy has occurs between them.

BRIEF DESCRIPTION OF THE DRAWINGS

Additional objects and advantages of the present invention will be apparent from the following detailed description of preferred embodiments thereof, which are best understood with reference to the accompanying drawings:

FIG. 3 is a diagram of an example of a table stored in an NV-RAM 38 of the image forming apparatus 3;

FIG. 4 is a diagram of an example of a setting screen, on an operation panel 32 of the image forming apparatus 3, for setting whether to solve a discrepancy automatically;

DESCRIPTION OF THE PREFERRED FOR EMBODIMENTS

The following is a detailed description of main embodiments of the invention, with reference to the drawings in which the same numerical references designate the corresponding elements throughout the different drawings.

(Embodiment 1)

Figure 1:
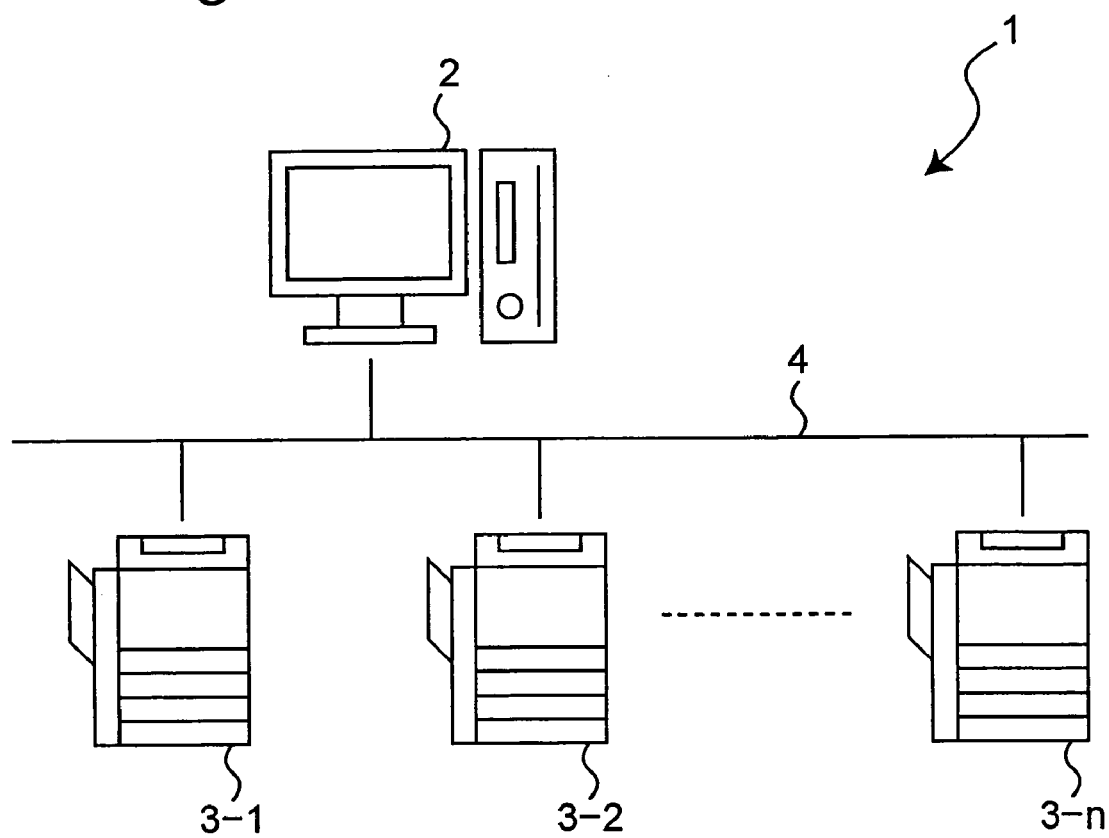
FIG. 1 is a diagram of a configuration example of an image forming system according to an embodiment 1 of the present invention.

FIG. 1 is shows a configuration example of an image forming system according to an embodiment 1 of the present invention. As shown in FIG. 1, the image forming system 1 according to the embodiment 1 has a terminal 2 and n number of image forming apparatuses 3-1 to 3-n. The terminal 2 and the image forming apparatuses 3-1 to 3-n are connected to each other by a network 4 such as a LAN. Each of the image forming apparatuses 3-1 to 3-n prints on a sheet of paper a scanned original image or image received from the terminal 2. Each of the image forming apparatuses 3-1 to 3-n is, for example, a Multiple Function Peripheral. Although only one terminal 2 is connected to the network 4 as shown in FIG. 1, a plurality of terminals may be connected to the network 4. Further, the image forming apparatuses 3-1 to 3-n may not need to be identical in the configuration. It should be noted that the image forming apparatuses 3-1 to 3-n are not described as separately and each of them is described as an image forming apparatus 3 hereinafter.

Figure 2:
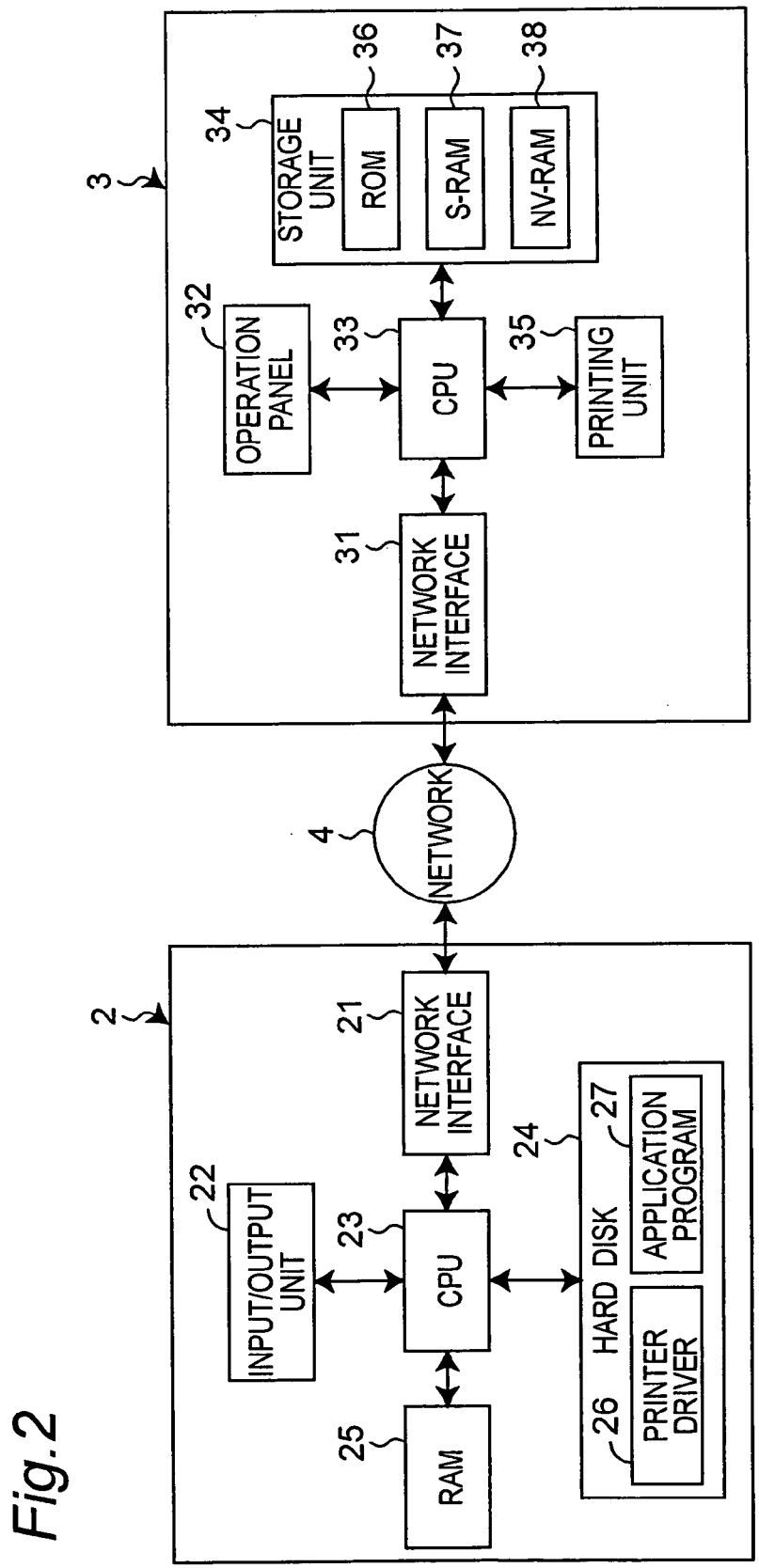
FIG. 2 is a block diagram showing each configuration example of a terminal 2 and an image forming apparatus 3.
Figure 5:
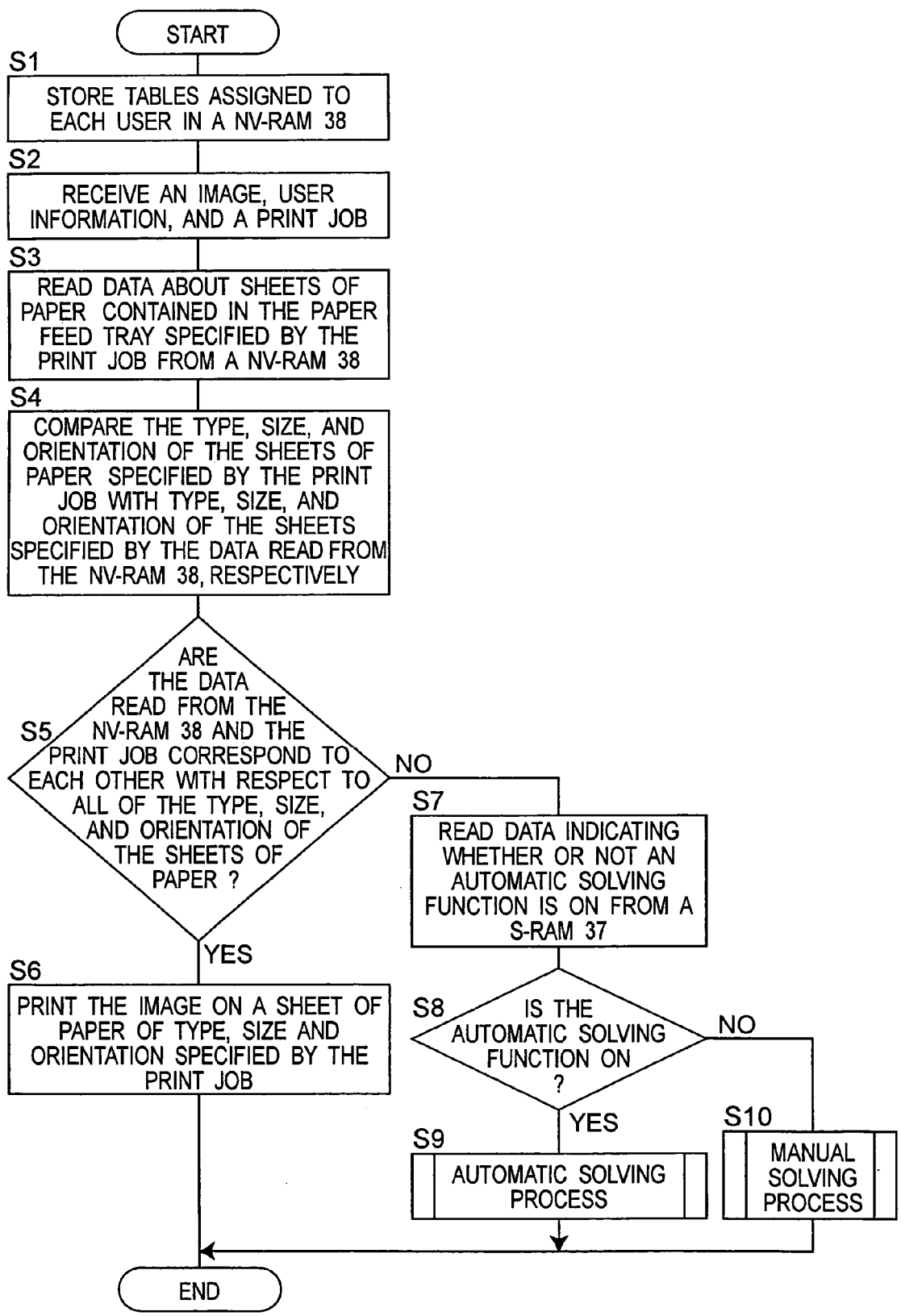
FIG. 5 is a flowchart of a control flow example of the CPU 33 when the print job is received from the terminal 2.

FIG. 2 is a block diagram showing each configuration example of the terminal 2 and the image forming apparatus 3. As shown in FIG. 2, the terminal 2 has a network interface 21, an input/output unit 22, a CPU 23, a hard disk 24, and a RAM 25. The network interface 21 is connected to the network 4, and exchanges data with any other apparatus connected to the network 4. The input/output unit 22 has an input device such as a keyboard or a mouse, and an output device such as a display. The hard disk 24 stores software programs including a printer driver 26, an application program 27 or the like. The CPU 23 controls each of components connected thereto according to a control program stored in the hard disk 24. The network interface 21 acts as a sending and receiving device.

The image forming apparatus 3 has a network interface 31, an operation panel 32, a CPU 33, a storage unit 34, and a printing unit 35. The operation panel 32 has an array of keys including, for example, ten keys for inputting data and log-off keys used for log-off by the user, and a display. The network interface 31 is connected to the network 4, and exchanges data with any other apparatus connected to the network 4. The network interface 31 may be installed in a printer controller, for example. The storage unit 34 has a ROM 36, a system RAM 37 (referred to as an "S-RAM" hereinafter), and a nonvolatile memory 38 (referred to as an "NV-RAM" hereinafter). The S-RAM 37 is backed up by a battery to maintain the data when the image forming apparatus 3 is disconnected from its power source. The NV-RAM 38 stores various settings to form an image. The CPU 33 is provided for controlling each of components connected thereto according to a control programs stored in the ROM 36. The network interface 31 acts as a sending and receiving device.

The printing unit 35 is controlled to print by the CPU 33. The printing unit 35 has a plurality of paper feed trays each of which can contain sheets of paper which are different from them contained in the other paper feed trays in at least one of type, size, and orientation. Each of the paper feed trays is equipped with one or more sensors for detecting the type, size, and orientation of the sheets of paper contained therein. Information detected by the one or more sensors, that is, the data indicating the type, size, and orientation of the sheets of paper contained in each paper feed tray is stored in the NV-RAM 38, which is controlled by the CPU 33. The data is appropriately updated by the output signal of each of the one or more sensors. The printing unit 35 has a function of turning the sheet of paper contained in each paper feed tray.

The operations of the terminal 2 and the image forming apparatus 3 will be described in more detail. When requesting to print an image generated by the application program 27, a user inputs a predetermined signal to the terminal 2 by using the keyboard or the like of the input/output unit 22. Upon receiving the predetermined signal from the input/output unit 22, the CPU 23 of the terminal 2 starts a printer driver 26 stored in the hard disk 24 to display a setting screen on the display of the input/output unit 22. The setting screen is used for setting a degree of significance of the image, the printing conditions for printing the image, and other parameters required to form the image. Here, the printing conditions may include the size, type, and orientation of a sheet of paper on which the image is printed, the location of stapling or punching on the sheet of paper, and the paper feed tray used to print the image in the image forming apparatus 3, and so on. When the user uses the input device such as a keyboard to input the printing conditions and the degree of significance of the image, the CPU 23 drives the network interface 21 to send an image, a print job including the degree of significance of the image and the printing conditions for printing the image, and information about the user (referred to as "user information" hereinafter) to an image forming apparatus 3.

The image, the print job and the user information (referred to as "print job etc." hereinafter) are received by the network interface 31 of the image forming apparatus 3 from the terminal 2 via the network 4. Upon receiving the print job etc. by its network interface 31, the image forming apparatus 3 generates the printing conditions on the basis of the received print job and setting of the image forming apparatus 3. For example, the image forming apparatus 3 generates the printing conditions indicating the size, type, and orientation of a sheet of paper on which the image is print, and the location of stapling or punching on the sheet of paper, on the basis of them. The generated printing conditions are then stored in the NV-RAM 38.

Further, the CPU 33 of the image forming apparatus 3 compares the first printing conditions, specified by the print job, and the second printing conditions, generated by the image forming apparatus 3, to determine whether or not one or more discrepancies occur between the first and second printing conditions. When one or more discrepancies are determined to occur between them, a table stored in the NV-RAM 38 is used to set a solution for each of the one or more discrepancies, which is one of one or more solutions in the table.

FIG. 3 shows an example of each of two tables stored in the NV-RAM 38. Each table stores discrepancies to be determined to occur between the first and second printing conditions and solutions each of which correspond to each of the discrepancies. Further, the solutions are set for each of degrees of significance of the image. It is assumed in the following descriptions that the first printing conditions specify the size, type, and orientation of a sheet of paper on which the image is printed, the location of stapling or punching on the sheet of paper, and a type of the paper feed tray to be used in the image forming apparatus 3, while the second printing conditions specify the size, type, and orientation of the sheet of paper on which the image is printed, and the location of stapling or punching on the sheet of paper. FIG. 3 shows the tables assigned to each of two persons, "Saka" and "Suzuki", each of which stores a plurality of solutions each of which corresponds to each of a plurality of discrepancies to occur between the first and second printing conditions. For example, in printing an image by "Saka", when discrepancies occur between the first and second printing conditions, with respects to both the size and type of the sheet, the image forming apparatus 3 selects a paper feed tray containing sheets of paper of both the size and type corresponding to the first printing conditions, if the degree of significance of the image is "A" indicating that the image is most significant. And then, the image forming apparatus 3 prints the image on a sheet of paper contained in the selected paper feed tray. While, if the degree of significance of the image is "B" indicating that the image is moderately significant, the image forming apparatus 3 selects a paper feed tray containing sheets of paper of the size specified by the first printing condition, and prints the image on a sheet of paper from the selected paper feed tray. In the latter case, the type of the sheets of paper may correspond to that specified by the first printing conditions or may not. When the degree of significance of the image is "C" indicating that the image is not specifically significant, the image forming apparatus 3 selects a paper feed tray containing sheets of paper of both the size and type specified by the second printing conditions, and prints the image on a sheet of paper contained in the selected paper feed tray. When a discrepancy occurs between the first and second printing conditions with respect to the location of stabling or punching on sheets of paper, if the degree of significance of the image is "A", the image forming apparatus 3 turns the sheets of paper to match the location of stabling or punching on the sheets of paper to that specified by the first printing condition. While the degree of significance of the image is either "B" or "C", the image forming apparatus 3 may print the image on a sheet of paper of the orientation specified by the second printing condition. As apparent from FIG. 3, a solution for each of the discrepancies to occur between the first and second printing conditions can be set individually for each user.

Further, the user can preset whether one or more discrepancies between the first and second printing conditions are solved by automatically setting a solution for each of the one or more discrepancies with the use of the table, or by manually inputting printing conditions, each of which corresponds to each of the one or more discrepancies by using the operation panel 32. FIG. 4 shows a setting screen displayed on the operation panel 32 of the image forming apparatus 3 with which the user select either the automatic process or manual process as a process for solving the discrepancies. When "ON" button on the setting screen is pressed by the user, the image forming apparatus 3 turns on an automatic discrepancy solving function (referred to as "automatic solving function" hereinafter). When the automatic solving function is on, if a discrepancy occurs between the first and second printing conditions, the image forming apparatus 3 automatically solve the discrepancy by using the table.

FIGS. 5 to 8 show flowcharts of a control flow of the CPU 33 of the image forming apparatus 3, in the case where the image forming apparatus 3 receives the print job etc. from the terminal 2. It is assumed in the following descriptions that the first printing conditions specify the size, type, and orientation of a sheet of paper on which the image is printed and a type of the paper feed tray to be used in the image forming apparatus 3, while the second printing conditions specify the size, type, and orientation of the sheet of paper on which the image is printed. First, the CPU 33 drive the NV-RAM 38 to store tables assigned to each pre-registered user therein (step S1). Each table stores the solutions for the discrepancies to occur between the first and second printing conditions, which are, in advance, received from the terminal 2 via the network 4 or input directly from the operation panel 32. The CPU 33 drive the network interface 31 to receive the print job etc. from the terminal 2 over the network 4 (step S2), and then, read various data about the sheets of paper contained in the paper feed tray specified by the print job, from the NV-RAM 38 (step S3). The CPU 33 compares the type, size, and orientation of the sheets of paper specified by the print job with those specified by the data read from the NV-RAM 38, respectively (step S4). When the CPU 33 determines that the data read from the NV-RAM 38 and the print job correspond to each other with respect to all of the type, size, and orientation of the sheets of paper ("YES" in the step S5), it drives the printing unit 35 to print the image on the sheets of the size, type, and orientation specified by the print job (step S6). While the CPU 33 determines that the data read from the NV-RAM 38 and the print job don't correspond to each other with respect to at least one of the type, size, and orientation of the sheets ("NO" in the step S5), the CPU 33 read data indicating whether or not the automatic solving function is on, from the S-RAM 37 (step S7). When the CPU 33 determines that the automatic solving function is on ("YES" in the step S8), it starts an automatic solving process (step S9). While determining that the automatic solving function is off ("NO" in the step S8), the CPU 33 starts a manual solving process (step S10).

Figure 6:
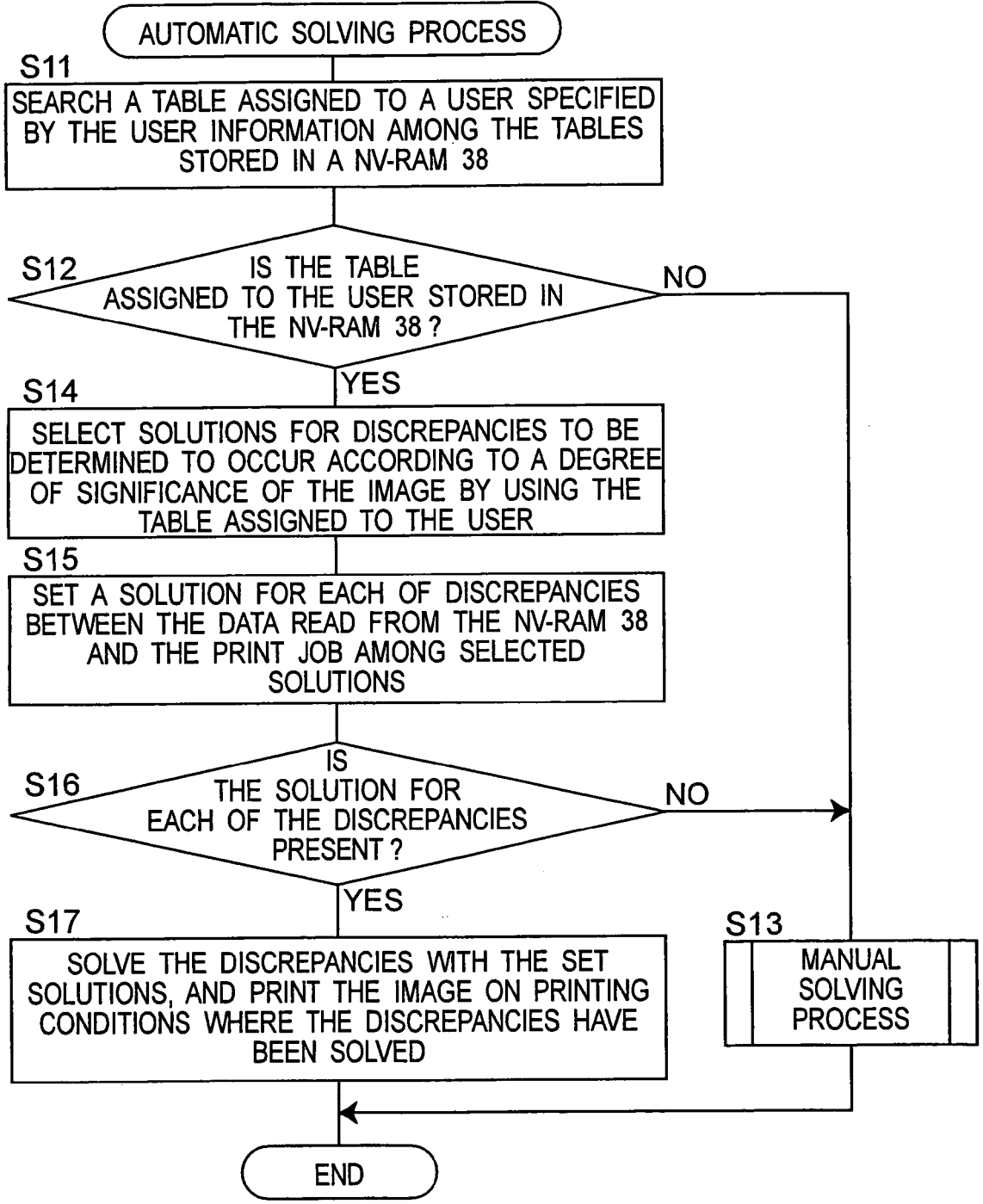
FIG. 6 is a flowchart of a control flow example of the CPU 33 in the automatic solving process.

FIG. 6 is a flowchart showing an example of a control flow of the CPU 33 in the automatic solving process. As shown in FIG. 6, first, the CPU 33 searches a table assigned to a user specified by the user information received from the terminal 2, among the tables stored in the NV-RAM 38 (step S11). When the CPU 33 determines that the table assigned to the user is not stored in the NV-RAM 13 ("NO" in the step S12), it starts the manual solving process (step S13). On the other hand, when determining that the table assigned to the user is stored in the NV-RAM 13 ("YES" in the step S12), the CPU 33 selects, by using the table assigned to the user, the solutions for discrepancies to be determined to occur according to the degree of significance of the image received from the terminal 2 (step S14). Next, the CPU 33 sets a solution, among the solutions selected in the step S14, for each of the discrepancies which have been determined to occur (step S15). When the CPU 33 determines that the solution for each of the discrepancies which have been determined to occur is present among the solutions selected in the step S14 ("YES" in the step S16), it drives the printing unit 35 to solve the discrepancies determined to occur with the set solutions, and print the image on printing conditions where the discrepancies have been solved (step S17). Specifically, the image is printed on the first printing conditions or the second printing conditions where the discrepancies have been solved, that is, the image is printed on the sheets of the type, size, and orientation with respect to which the discrepancies have been solved. On the other hand, when the CPU 33 determines that the solution for each of the discrepancies which have been determined to occur is not present among the solutions selected in the step S14 ("NO" in the step S16), that is, at least one of the solutions for the discrepancies determined to occur is not present among them, the CPU 33 starts the manual solving process (step S13).

Figure 7:
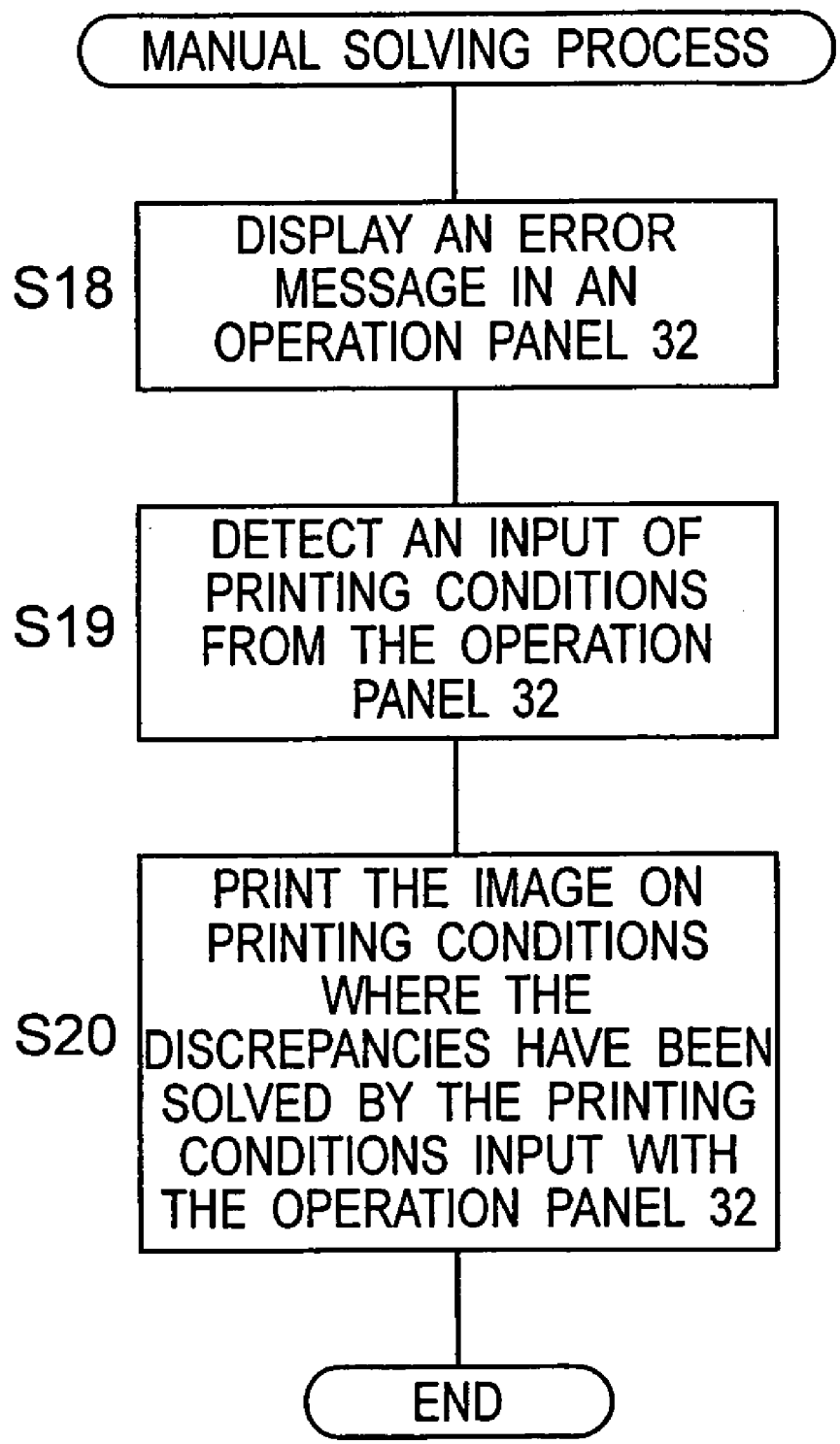
FIG. 7 is a flowchart of a control flow example of the CPU 33 in the manual solving process.

FIG. 7 is a flowchart showing an example of a control flow of the CPU 33 in the manual solving process. First, the CPU 33 drives the operation panel 32 to display an error message on it, indicative of the presence of any discrepancy between the first and second printing conditions (step S18). When finding the error message displayed on the operation panel 32 (step S18), the user manually inputs, with the operation panel 32, a printing condition (sometimes referred to as "user-input printing condition" hereinafter) for each of the discrepancies determined to occur, for example, the type of a sheet of paper on which the image is printed. When the CPU 33 detects that the user-input printing conditions have been input from the operation panel 32 (step S19), it drives the printing unit 35 to solve the discrepancies determined to occur with the user-input printing conditions, and to print the image on printing conditions where the discrepancies have been solved (step S20). Specifically, if the first and second printing conditions don't correspond to each other with respect to a part of printing conditions required to print the image, the image is printed on the user-input printing conditions for solving the discrepancies between the first and second printing conditions, and printing conditions which are common between the first and second printing conditions. Here, the error message may indicate the type of each of the discrepancies determined to occur. While the error message indicates only the occurrence of the any discrepancy between the first and second printing conditions, the user inputs user-input printing conditions with respect to all printing conditions required to print the image. Alternatively, in the manual solving process, user can input only a printing condition for solving the discrepancy, a solution for which is not present among the solutions selected in the step S14. In this case, in the step S20, for example, the image is printed on the user-input printing conditions, a printing condition where a discrepancy is solved by the solution set in the step S15, and a printing condition which is common between the first and second printing conditions.

In the image forming system 1 according to the embodiment 1, when a discrepancy has occurred between the first printing conditions set by a user and the second printing conditions set by the image forming apparatus 3, the image forming apparatus 3 automatically solves the discrepancy to continue the printing processing. Thus, it enables a smooth printing processing, and therefore, the system can be improved in the operability. Further, the table can be set for each user, and therefore, a solution for each of the discrepancies to be determined to occur between the first and second printing conditions can be set for each user.

In the above-mentioned image forming apparatus 3, the CPU 33 drives the operation panel 32 to display an error message and starts the manual solving process, immediately when it determines that the table assigned to the user specified by the user information is not present in the NV-RAM 38, or determine that the solution for each of the discrepancies which have occurred is not present in the table assigned to the user specified by the user information. However, in the same case, the CPU 33 may read printing conditions stored in the NV-RAM 38, each of which is stored as being related to a discrepancy in the NV-RAM 38 each time it is input by the user, and may drive the printer unit 38 to print the image on the read printing conditions.

Figure 8:
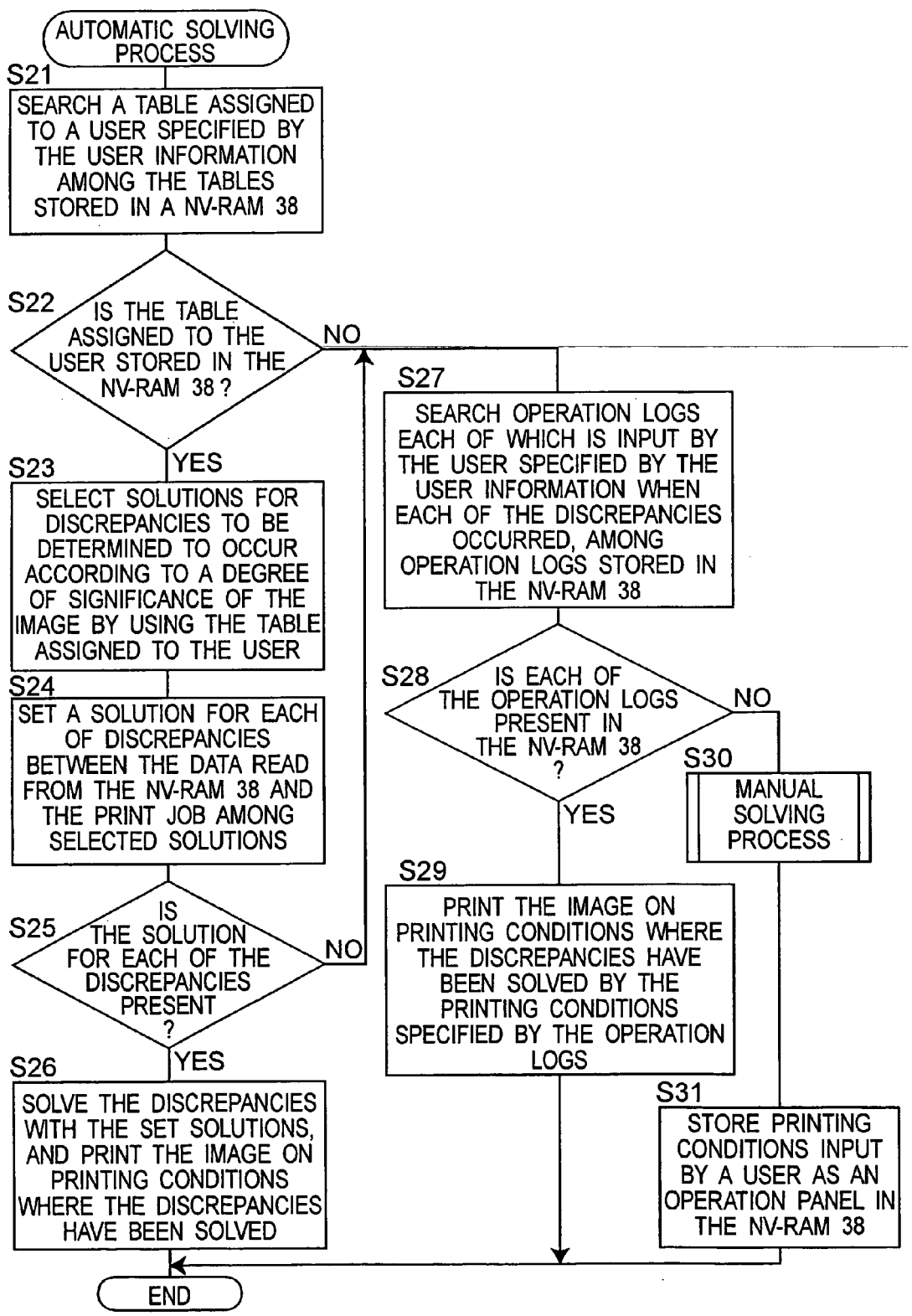
FIG. 8 is a flowchart showing an example of a control flow of the CPU 33 including a step of reading the printing conditions stored in the NV-RAM 38.

FIG. 8 is a flowchart showing an example of a control flow of the CPU 33 in the above described process including a step of reading the printing conditions stored in the NV-RAM 38. The flowchart shown in FIG. 8 is different from that shown in FIG. 6 in the steps following "NO" in the step S22 and ones following "NO" in the step S 25. Steps S21 to S26 in the flowchart as shown in FIG. 8 are equal to the steps S11 to S17 in the flowchart as shown in FIG. 6, and therefore, those steps will be explained in no more detail.

As shown in FIG. 8, when determining that the table assigned to the user specified by the user information is not present among the tables stored in the NV-RAM 38 ("NO" in the step S22), or determining that the solution for each of the discrepancies determined to occur is not present among the solutions selected according to the degree of the significance of the image ("NO" in the step S22), the CPU 33 searches operation logs (referred to as "specific operation logs" hereinafter) each of which was input by the user specified by the user information when the same discrepancy as each of the discrepancies determined to occur in the step 5 occurred in the past, among the operation logs stored in the NV-RAM 38 (step S27) When the CPU 33 determines that each of such specific operation logs is present in the NV-RAM 38 ("YES" in the step S28), it sets the printing conditions a printing condition (sometimes referred to as "prestored printing condition" hereinafter) specified by the specific operation logs, and drive the printing unit 35 to print the image on printing conditions where the discrepancies have been solved by the set prestored printing conditions (step S29). Specifically, if the first and second printing conditions don't correspond to each other with respect to a part of printing conditions required to print the image, the image is printed on the prestored printing conditions for solving the discrepancies determined to occur between the first and second printing conditions and printing conditions which are common between the first and second printing conditions. On the other hand, when determining that at least one of the specific operation logs is not stored in the NV-RAM 38 ("NO" in the step S28), the CPU 33 starts the manual solving process (step S30). Then, the CPU 33 drives the NV-RAM 38 to store the printing conditions input with the operation panel 32 in the manual solving process, as specific operation logs (step S31). Alternatively, in step S27, the CPU 33 can search only an operation log for solving the discrepancy, a solution for which is not present among the solutions selected in the step S25. In this case, in the step S29, for example, the image is printed on the prestored printing conditions, a printing condition where a discrepancy is solved by the solution set in the step S24, and a printing condition which is common between the first and second printing conditions.

Figure 9:
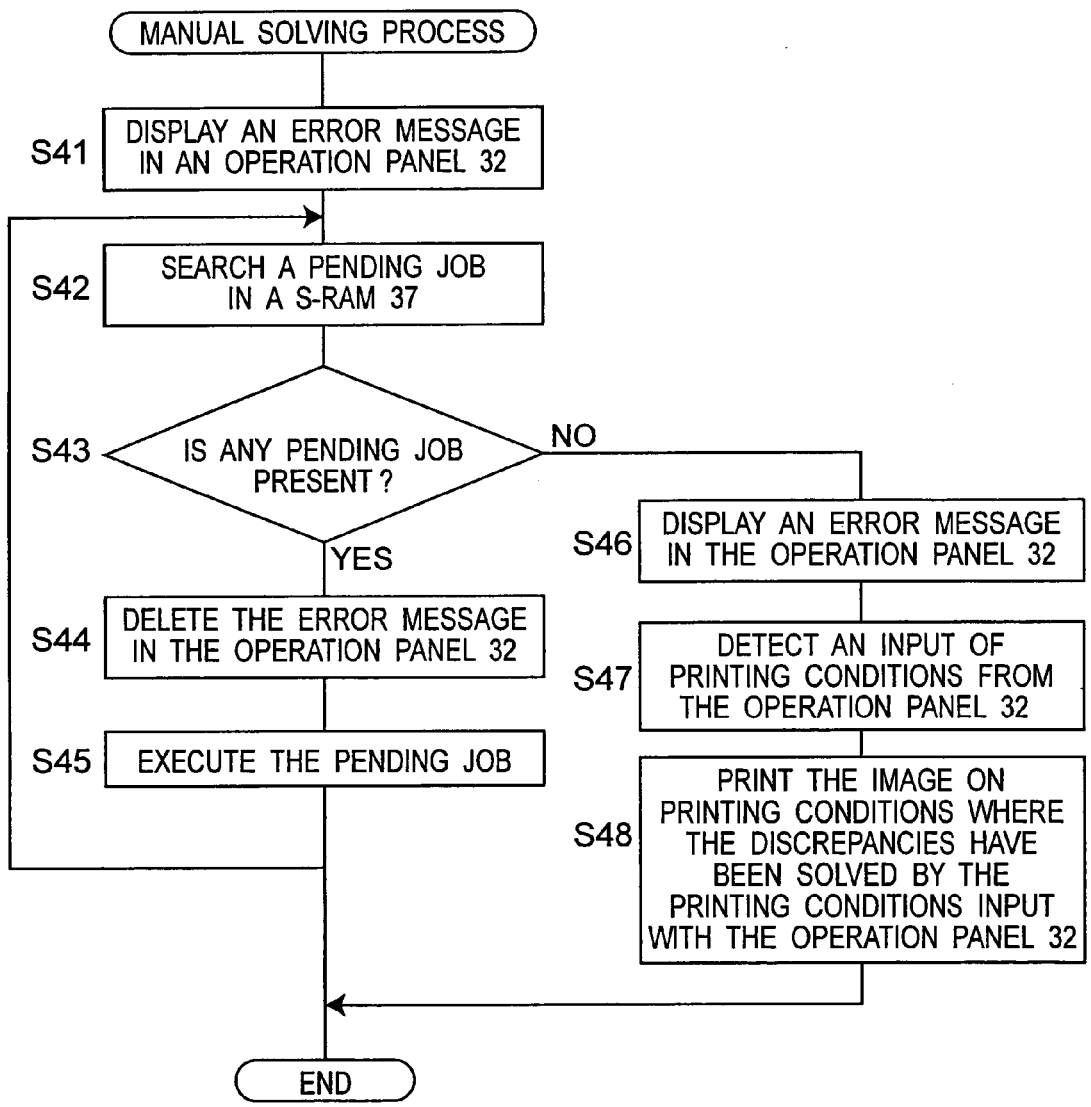
FIG. 9 is a flowchart showing a modification of the manual solving process shown in FIG. 7.

FIG. 9 is a flowchart showing a modification of the manual solving process shown in FIG. 7. As shown in FIG. 9, the CPU 33 drives the operation panel 32 to display an error message, on its display, indicating the presence of any discrepancy between the first and second printing conditions (step S41). The CPU 33 searches a pending job or waiting job with respect to the print processing in the S-RAM 37 (step S42). When determining that any pending job is present ("YES" in the step S43), the CPU 33 drives the operation panel 32 to delete the error message displayed on it (step S44), and executes the pending job being present in the S-RAM 37 (step S45). When determining that the pending job is executed (step S45), the CPU 33 starts at the step S42 again. When determining that all the pending jobs are executed and any pending job is not left (step S43), the CPU 33 drives the operation panel 32 to display an error message again (step S46). The process after the step S46 is equal to that explained with reference to FIG. 7.

For ease of the operation, the operation panel 32 may display an example of solutions, that is, appropriate printing conditions for allowing the user to manually solve the discrepancies determined to occur, together with the error message, in the step S18 shown in FIG. 7.

In the image forming system according to the embodiment 1, a solution for each of the discrepancies determined to occur between the first and second printing conditions is set according to the degree of significance of the image to be printed. However, it may be set according to any other requirement. Also, each of the discrepancies may be solved by a predetermined solution for each of the discrepancies, regardless of the degree of significance of the image. Moreover, the image forming apparatus 3 may store any other type of table such as a table which provides all the users with one particular solution for one type of discrepancy to be determined to occur. Even in these cases, the image forming apparatus 3 automatically solve each of discrepancies which has occured between the first printing conditions set by the user, and the second printing conditions set by the image forming apparatus 3 to continue the printing processing. Thus, it can enable a smooth printing process, and therefore, the system can be improved in the operability.

Although the second printing conditions preset in the image forming apparatus 3 are, in this embodiment, generated on the basis of the setting of it and the first printing conditions specified by the print job received from the terminal 2, they may be generated on the basis of the setting of the image forming apparatus 3 and the image received from the terminal 2. For example, the image forming apparatus 3 may generate a printing condition indicative of the size of a sheet of paper, in response to the image received from the terminal 2. The above-mentioned descriptions can also be applied to this case.

(Embodiment 2)

An image forming system according to an embodiment 2 of the present invention will now be described. The image forming system according to the embodiment 2, terminals and image forming apparatuses in the image forming system are substantially equal to them described in the embodiment 1, in their configurations. The image forming apparatus 1 according to the embodiment 2 is different from that according to the embodiment 1 in that the table shown in FIG. 3 is stored not in the NV-RAM 38 of the image forming apparatus 3 but in the hard disk 24 of the terminal 2.

Figure 10:
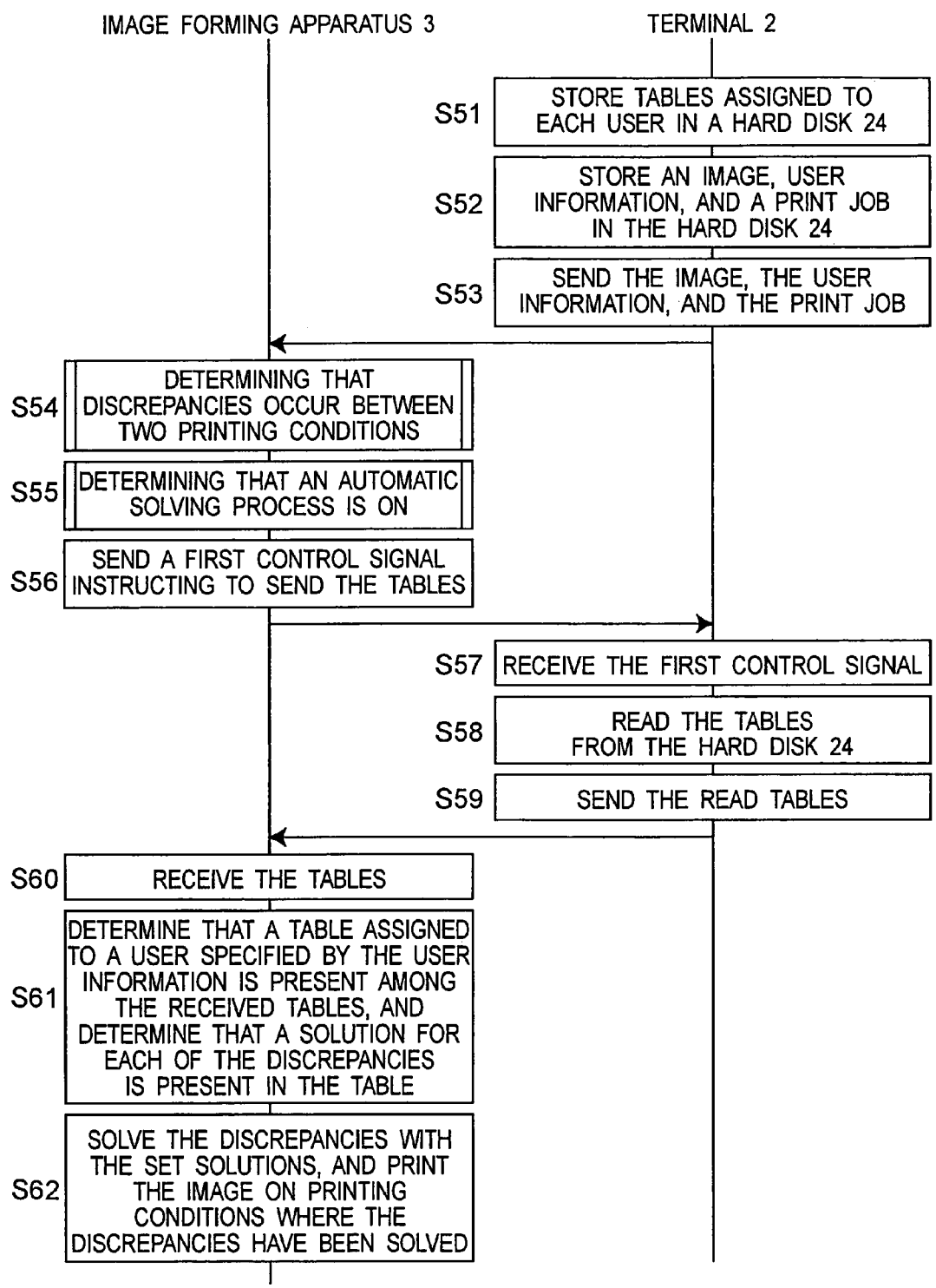
FIG. 10 is a an example of each control flow of CPU 23 and CPU 33, included in the terminal 2 and the image forming apparatus 3, respectively, when a discrepancy occurs between the first and second printing conditions.

FIG. 10 is an example of each control flow of CPU 23 and CPU 33, included in the terminal 2 and the image forming apparatus 3, respectively, when a discrepancy occurs between the first and second printing conditions. As shown in FIG. 10, the CPU 23 of the terminal 2 drives the hard disk 24 to store tables assigned to each user. Each of the tables is, for example, generated on the basis of the data input with the input/output unit 22 (step S51). Further, the CPU 23 drives the hard disk 24 to store user information and the print job input with the input/output unit 22, together with the image corresponding to them (step S52). Then, the CPU 23 drives the network interface 21 to send the image, the user information, and the print job to the image forming apparatus 3 (step S53). In response, the CPU 33 of the image forming apparatus 3 drives the network interface 31 to receive the image, the user information, and the print job. Then the CPU 33 determines that discrepancies occur between the first printing conditions and the second printing conditions (step S54), and determines that the automatic solving function is on (step S55). The CPU 33 then drives the network interface 31 to send a first control signal to the terminal 2 (step S56). The first control signal is a signal instructing to send the tables to the image printing apparatus 3. The process of the step S54 is substantially equal to the processes of the steps S2 to S5 ("NO" in the step S5) shown in FIG. 5. The process of the step S55 is substantially equal to the processes of the steps S7 and S8 ("YES" in the step S8) shown in FIG. 5.

When driving the network interface 21 to receive the first control signal (step S57), the CPU 23 of the terminal 2 reads the tables from the hard disk 24 (step S58), and drives the network interface 21 to send them to the image forming apparatus 3 (step S59). The CPU 33 of the image forming apparatus 3 drives the network interface 31 to receive the tables (step S60). When determining that a table assigned to the user specified by the user information is present among the received tables, and determining that a solution for each of the discrepancies is present in the table (step S61), the CPU 33 drives the printer unit 35 to solve the discrepancies with the set solutions, and print the image on the first printing conditions or the second printing conditions where the discrepancies have been solved (step S62). The step S61 in the flowchart of FIG. 10 is equivalent to the steps S11 to S16 ("YES" in the steps S12 and S16) in the flowchart of FIG. 6.

When determining that a table assigned to a user specified by the user information is not present among the received tables, and determining that a solution for each of the discrepancies is not present in the table, the printing process may be carried out either on printing conditions where the discrepancies are solved by the printing conditions input from the operation panel 32, or the third conditions specified by the operation logs stored in the image forming apparatus 3, as described with the embodiment 1.

Figure 11:
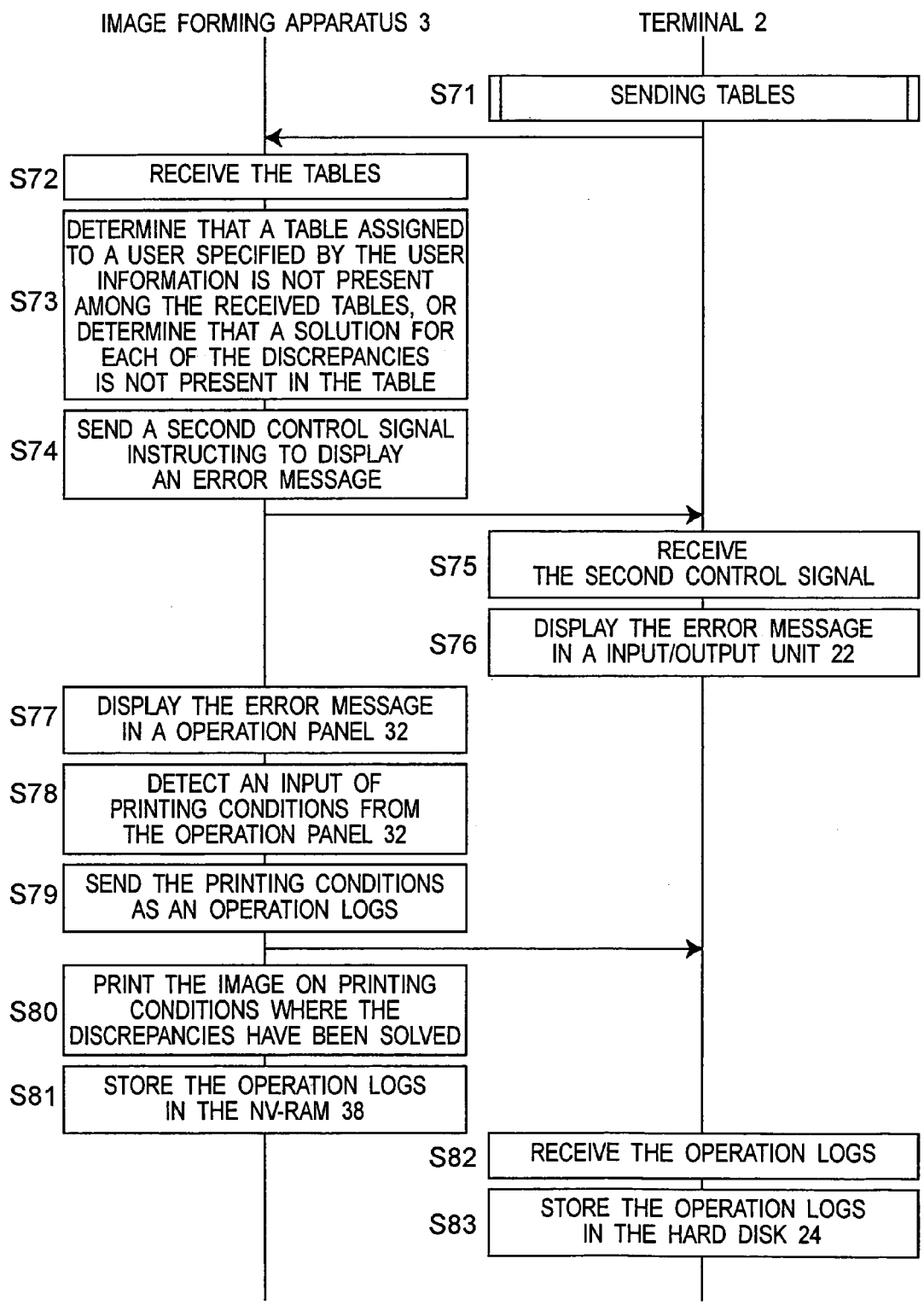
FIG. 11 is an example of each control flow of CPU 23 and CPU 33, when the printing is made on printing conditions where the discrepancies are solved by the printing conditions input with the operation panel 32.

FIG. 11 is an example of each control flow of CPU 23 and CPU 33, included in the terminal 2 and the image forming apparatus 3, respectively, when the printing is made on printing conditions where discrepancies are solved by the printing conditions input with the operation panel 32. The steps before the tables are send from the terminal 2 to the image forming apparatus 3 are substantially equal to steps S51 to S59 shown in FIG. 10, and therefore, will be explained in no more detail. In FIG. 11, these steps are expressed by "sending tables" (step S71). The CPU 23 of the terminal 2 drives the network interface 21 to send the tables stored in the hard disk 24 to the image forming apparatus 3 (step S71), and in turn, the CPU 33 of the image forming apparatus 3 drives the network interface 31 to receive the tables (step S72). When determining that a table assigned to the user specified by the user information is not present among the received tables, or determining that a solution for each of the discrepancies is not present in the table (step S73), the CPU 33 drives the network interface 31 to send a second control signal to the terminal 2, instructing to display an error message (step S74).

When driving the network interface 21 to receive the second control signal from the image forming apparatus 3 (step S75), the CPU 23 of the terminal 2 drives the input/output unit 22 to display on its display the error message indicating the discrepancies determined to occur between the two printing conditions (step S76). While, the CPU 33 of the image forming apparatus 3 also drives the operation panel 32 to display the same error message on its display (step S77). This allows the user to view the error message on the operation panel 32 (step S77), and manually input the printing conditions for solving the discrepancies determined to occur with the operation panel 32. When the CPU 33 detects that the user-input printing conditions has been input with the operation panel 32 (step S78), it drives the network interface 31 to send the user-input printing conditions as operation logs to the terminal 2 (step S79), and drives the printer unit 35 to solve the discrepancies with the user-input printing conditions input with the operation panel 32, and to print the image on printing conditions where the discrepancies determined to occur have been solved (step S80) Further, the CPU 33 stores the user-input printing conditions input from the operation panel 32, as operation logs, in the NV-RAM 38 (step S81). Meanwhile, when driving the network interface 21 to receive the operation logs from the image forming apparatus 3 (step S82), the CPU 23 of the terminal 2 drives the hard disk 24 to store the received operation logs indicative of the user-input printing conditions input by the user (step S83).

Here, the, printing conditions input with the operation panel 32 are sent from the image forming apparatus 3 to, the terminal 2, which enables the image forming apparatus 3 to print the image with the operation logs stored in the terminal 2 after that, and enables users to refer the operation logs in the terminal 2.

Figure 12:
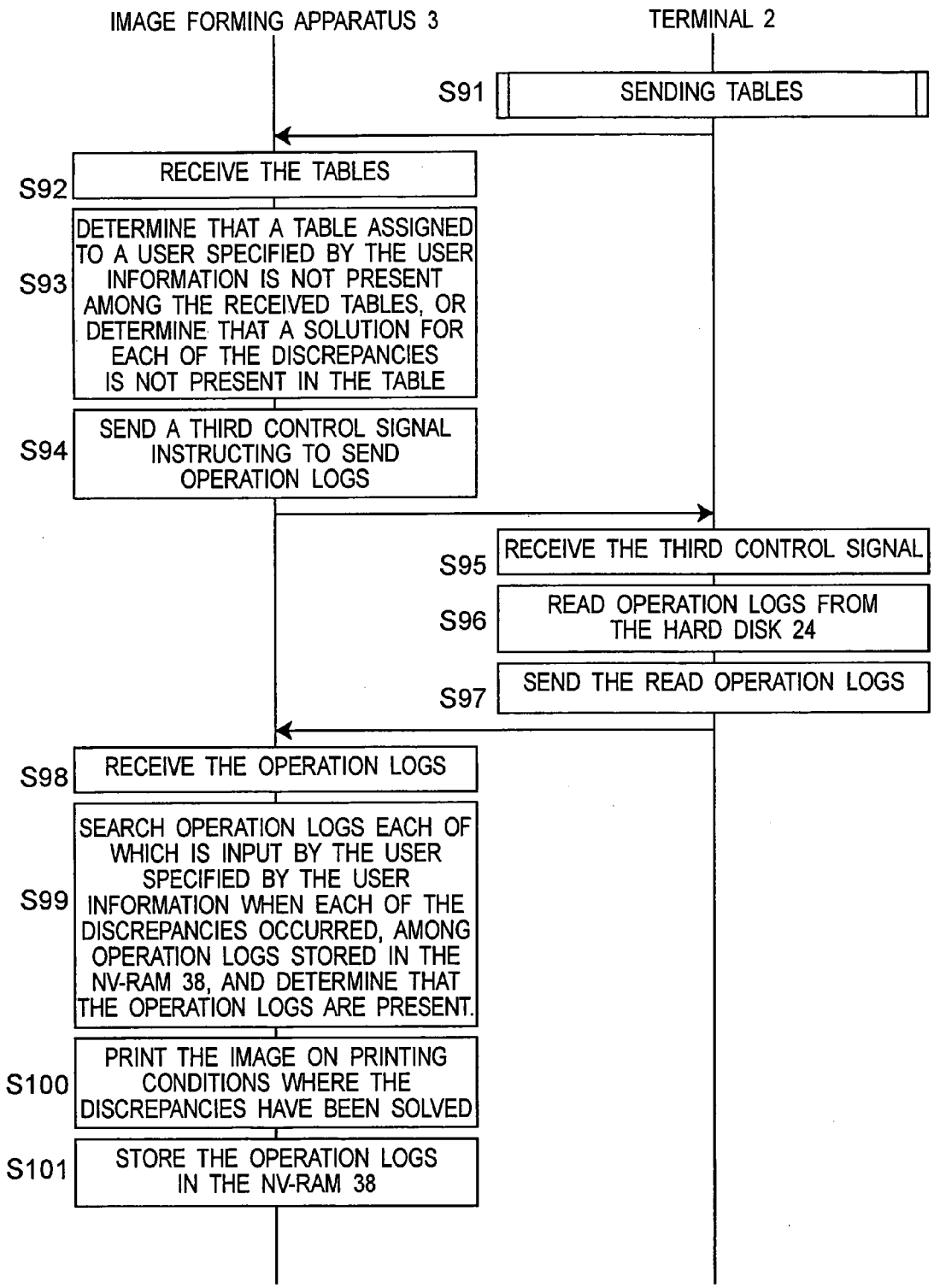
FIG. 12 is an example of each control flow of CPU 23 and CPU 33, when the image forming apparatus 3 prints the image by using the operation logs stored in the terminal 2.

FIG. 12 is an example of each control flow of CPU 23 and CPU 33, included in the terminal 2 and the image forming apparatus 3, respectively, when the image forming apparatus 3 prints the image according to the operation logs stored in the terminal 2. In FIG. 12, steps S91 to S93 are substantially equal to the steps S71 to S73 shown in FIG. 11, and therefore, will be explained in no more detail. When determining that a table assigned to a user specified by the user information is not present among the received tables, or determining that a solution for each of the discrepancies determined to occur is not present in the table (step S93), the CPU 33 drives the network interface 31 to send a third control signal to the terminal 2, instructing to send operation logs to the image forming apparatus 3 (step S94). In response, the CPU 23 of the terminal 2 drives the network interface 21 to receive the third control signal from the image forming apparatus 3 (step S95), and reads the operation logs from the hard disk 24 (step S96) The read operation logs are then transmitted by the network interface 21 to the image forming apparatus 3 (step S97).

The CPU 33 of the image forming apparatus 3 drives the network interface 31 to receive the operation logs from the terminal 2 (step S98). When searching an operation log (a specific operation log) input by the user specified by the user information when the same discrepancy as each of the discrepancies determined to occur occurred, among the received operation logs, and determining that the operation log is present (step S99), the CPU 33 drives the printer unit 35 to print the image on the prestored printing conditions specified by the specific operation log (step S100). Also, the CPU 33 drives the NV-RAM 38 to store the specific operation log therein (step S101).

Figure 13:
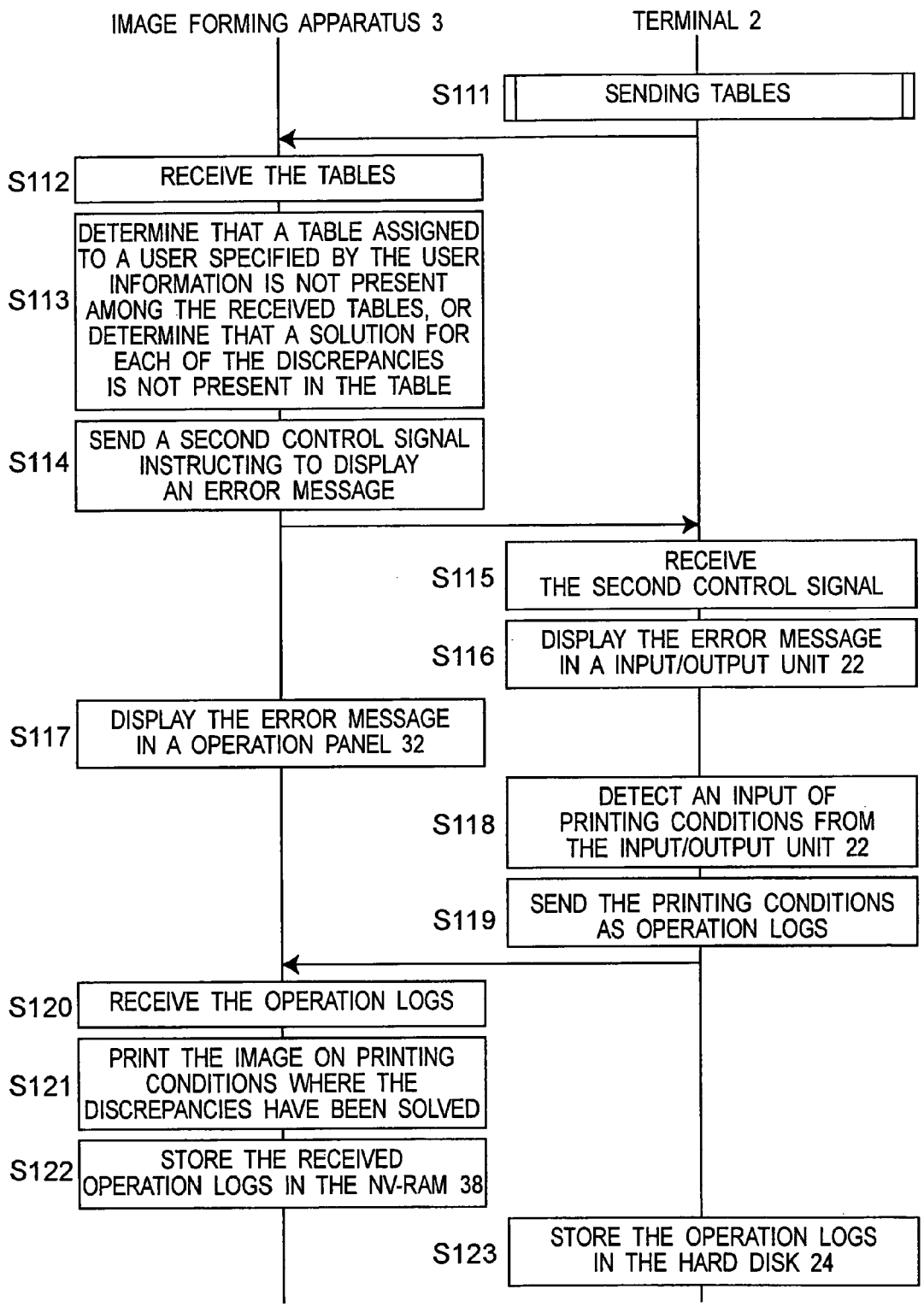
FIG. 13 is an example of the control flow of each of the CPU 23 and the CPU 33 for the direct entry of the operation log with the input/output unit 22.

The operation logs stored in the hard disk 24 of the terminal 2 may be input directly by the user with the input/output unit 22 of the terminal 2, other than received from the image forming apparatus 3. FIG. 13 is a flowchart showing an example of the control flow of each of the CPU 23 and the CPU 33 for the direct entry of the operation log with the input/output unit 22. In FIG. 13, steps S111 to S117 are substantially equal to steps S71 to S77 shown in FIG. 11 and will be explained in no more detail. When viewing the error message on the display of the input/output unit 22 (step S116), the user manually inputs the printing conditions for solving the discrepancies determined to occur with the input/output unit 22. The CPU 23 of the terminal 2 detects the input of the printing conditions from the input/output unit 22 (step S118), and drives the network interface 21 to send the printing conditions as operation logs to the image forming apparatus 3 (step S119). In turn, the CPU 33 of the image forming apparatus 3 drives the network interface 31 to receive the operation logs (step S120), and drives the printer unit 35 to print the image on the printing conditions specified by the operation logs (step S121). Further, the CPU 33 drives the NV-RAM 38 to store the operation logs therein (step S122). The CPU 23 of the terminal 2 drives the hard disk 24 to store the printing conditions therein which are input as the operation logs from the input/output unit 22 (step S123).

The image forming system according to the embodiment 2 can provided the same effects as the image forming system according to the embodiment 1. Also, as the user can input manually printing conditions for solving the discrepancies determined to occur with the input/output unit 22 of the terminal 2, when discrepancies occur between the first and second printing conditions, a troublesome task that the user goes to the image forming apparatus 3 and input printing conditions for solving the discrepancies with the operation panel 32 can be omitted.

If the operation logs are stored in the hard disk 24 of the terminal 2, as described above, the discrepancies can readily be solved by using the operation logs stored in the hard disk 24 of the terminal 2.

(Embodiment 3)

Figure 14:
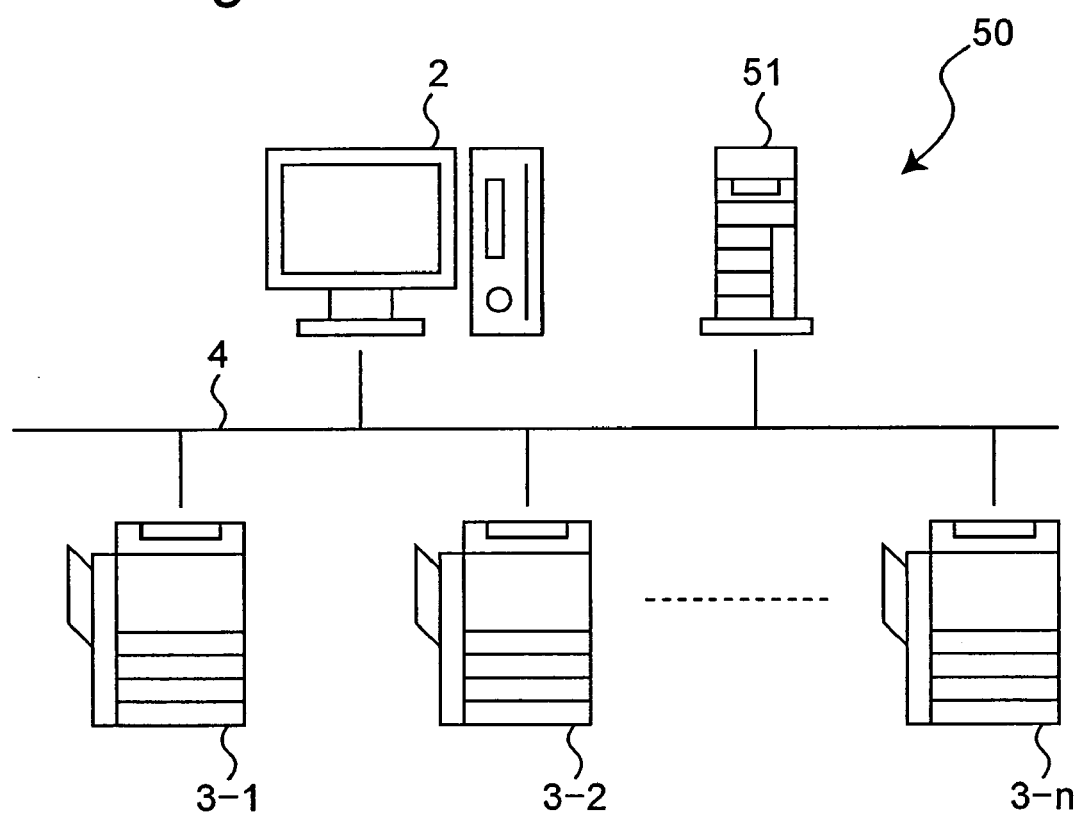
FIG. 14 is a diagram of a configuration example of an image forming system according to an embodiment 3 of the present invention.

FIG. 14 is a diagram of a configuration example of an image forming system according to an embodiment 3 of the present invention. The image forming system 50 according to the embodiment 3 is different from the image forming system 1 according to the embodiment 1 in that the image forming system 50 has a network server 51. The network server 51 is connected via the network 4 to the terminal 2 and an n number of the image forming apparatuses 3-1 to 3-n.

Figure 15:
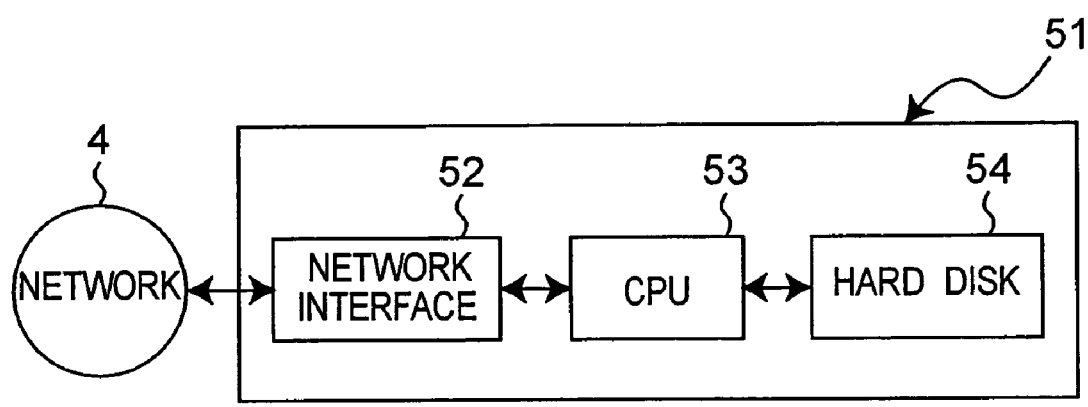
FIG. 15 is a block diagram of a configuration example of a network server 51.

FIG. 15 is a block diagram of a configuration example of the network server 51. As shown in FIG. 15, the network server 51 includes a network interface 52, a CPU 53, and a hard disk 54. The CPU 53 controls each of components connected thereto according to the control programs stored in the hard disk 54. The image forming system 50 of the embodiment 3 is different from the image forming system 1 of the embodiment 1 in that the table shown in FIG. 3 is stored in the hard disk 54 of the network server 51 but not in the NV-RAM 38 of the image forming apparatus 3.

Figure 16:
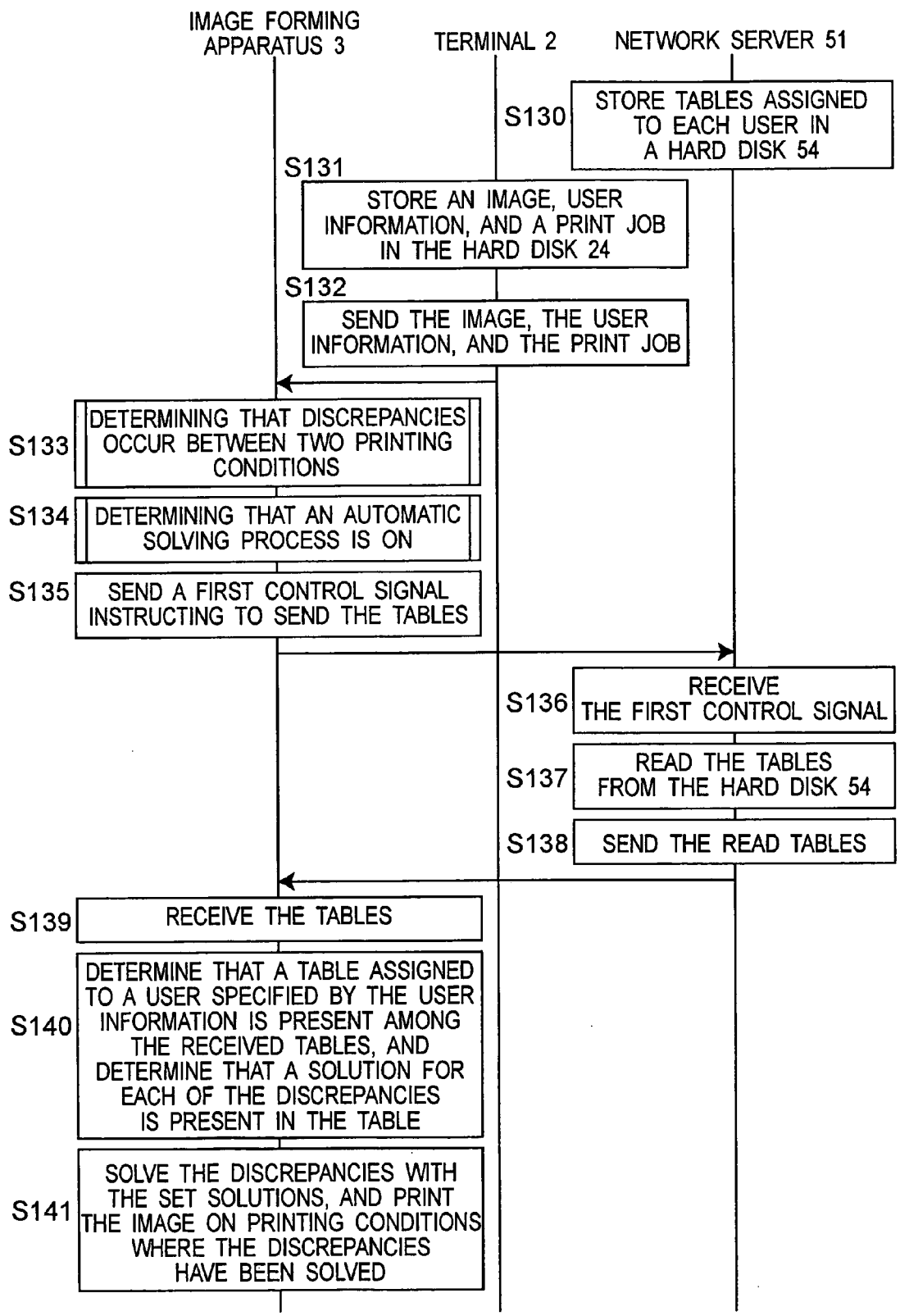
FIG. 16 is an example of each control flow of CPU 23, CPU 33 and CPU 53, when discrepancies occur between the first printing conditions specified by the print job received from the terminal 2 and the second printing conditions generated in the image forming apparatus 50.

FIG. 16 shows an example of each control flow of CPU 23, CPU 33 and CPU 53, included in the terminal 2, the image forming apparatus 3, and the network server 51, respectively, when discrepancies occur between the first printing conditions specified by the print job received from the terminal 2 and the second printing conditions generated in the image forming apparatus 50. As shown in FIG. 16, the CPU 53 of the network server 51 drives the hard disk 54 to store therein the tables assigned to each user therein (step S130). Further, the CPU 23 of the terminal 2 drives the hard disk 54 to store the user information and the print job input from the input/output unit 22, together with the image (step S131). Then, the CPU 23 drives the network interface 21 to send the image, the user information, and the print job to the image forming apparatus 3 (steps S132). In response, the CPU 33 of the image forming apparatus 3 drives the network interface 31 to receive the image, the user information, and the print job from the terminal 2. When the CPU 33 determines that discrepancies occur between the first printing conditions and the second printing conditions (step S133), and determines that the automatic solving function is on (step S134), it drives the network interface 31 to send a first control signal to the network server 51, instructing to send the tables to the image forming apparatus 3 (step S135). When the CPU 53 of the network server 51 drives the network interface 52 to receive the first control signal (step S136), it reads the tables from the hard disk 54 (step S137). Then, the CPU 53 drives the network interface 52 to send the tables to the image forming apparatus 3 (step S138). The step S133 is substantially equal to the steps S2 to S5 ("NO" in the step 5) shown in FIG. 5, while the step S134 in the flowchart of FIG. 16 is substantially equal to the steps S7 and S8 ("YES" in the step S8) shown in FIG. 5.

In response, the CPU 33 of the image forming apparatus 3 drives the network interface 31 to receive the tables from the network server 51 (step S139). When the CPU 33 determines that a table assigned to the user specified by the user information is present among the received tables, and determine that a solution for each of the discrepancies is present in the table (step S140), it drives the printing unit 35 to solve each of the discrepancies with the automatically set solution, and prints the image on printing conditions where the discrepancies have been solved (step S141). This step S141 is substantially equal to the step S6 shown in FIG. 5.

The image forming system according to the embodiment 3 can provide the same effect as the image forming system according to the embodiment 1. Further, in the image forming system according to the embodiment 3, as the tables are stored in the hard disk 53 of the network server 51, they can readily be accessed from each of one or more image forming apparatuses 3 and one or more terminals 2 connected with the network server 51. When the tables are stored in either an image forming apparatus 3 or a terminal 2, they can be accessed only when the image forming apparatus 3 or the terminal 2 is powered on. Thus, when the a terminal other than the terminal which stores the tables is used for printing, for example, the terminal which stores the tables also needs to be powered on. However, the image forming system of the embodiment 3 can eliminate such a troublesome process.

In the image forming system according to the embodiment 3, when the CPU 33 determines that a table assigned to the user specified by the user information is not present among the tables received from the network server 51, or determines that a solution for each of the discrepancies is not present among one or more solutions selected according to the degree of the significance of the image in the table assigned to the user specified by the user information, the operation logs stored in the hard disk 24 of the terminal 2 or in the hard disk 54 of the network server 51 can be used for solving the discrepancies determined to occur between the first and second printing conditions. The process where the discrepancies are solved by using the operation logs stored in the hard disk 24 of the terminal 2 is substantially equal to that described in the embodiment 2, and therefore, will be explained in no more detail.

Figure 17:
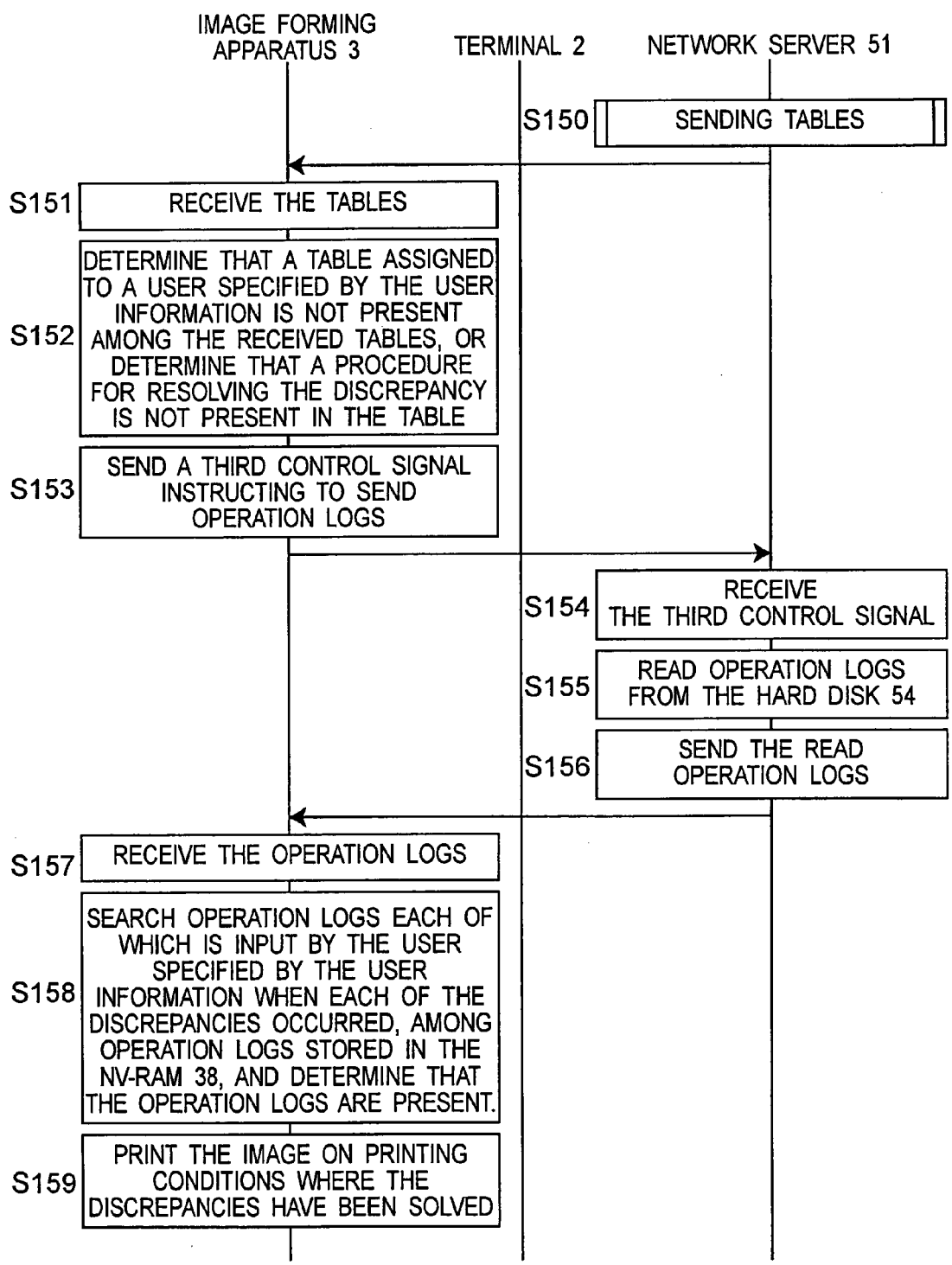
FIG. 17 is an example of each control flow of CPU 23, CPU 33, and CPU 53, when the printing process is carried on by using the operation logs stored in the network server 51.

FIG. 17 is an example of each control flow of CPU 23, CPU 33, and CPU 53, included in the terminal 2, the image forming apparatus 3, and the network server 51, respectively, when the printing process is carried on by using the operation logs stored in the network server 51. The steps before the tables are send from the network server 51 to the image forming apparatus 3 are substantially equal to steps S130 to S138 shown in FIG. 16 and will be explained in no more detail. In FIG. 17, the steps are expressed by sending the tables (step S150). The CPU 53 of the network server 51 drives the network interface 54 to send the tables stored in the hard disk 54 from the network interface 52 to the image forming apparatus 3 (step S150). In response, the CPU 33 of the image forming apparatus 3 drives the network interface 31 to receive the tables (step S151). When determining that a table assigned to a user specified by the user information is not present among the received tables, or determine that a solution for each of the discrepancies is not present in the table (step S152), the CPU 33 drives the network server 51 to send a third control signal to the network server 51 instructing to send operation logs to the image forming apparatus 3 (step S153). The CPU 53 of the network server 51 drives the network interface 52 to receive the third control signal from the image forming apparatus 3 (step S154), and read the operation logs from the hard disk 54 (step S155). Then, the CPU 53 drives the network interface 52 to send the read operation logs to the image forming apparatus 3 (step S156).

In response, the CPU 33 of the image forming apparatus 3 drives the network interface 31 to receive the operation logs from the network server 51 (step S157). When the CPU 33 searches an operation log input by the user specified by the user information when the same discrepancy as the discrepancies determined to occur occurred in the past, among the received operation logs, and determine that the operation log is present (step S158), the CPU 33 drives the printer unit 35 to print the image on printing conditions where the discrepancies determined to occur are solved by the prestored printing conditions specified by the operation logs (step S159).

The operation logs to be stored in the hard disk 54 of the network server 51 may be received from either the image forming apparatus 3 or the terminal 2.

Figure 18:
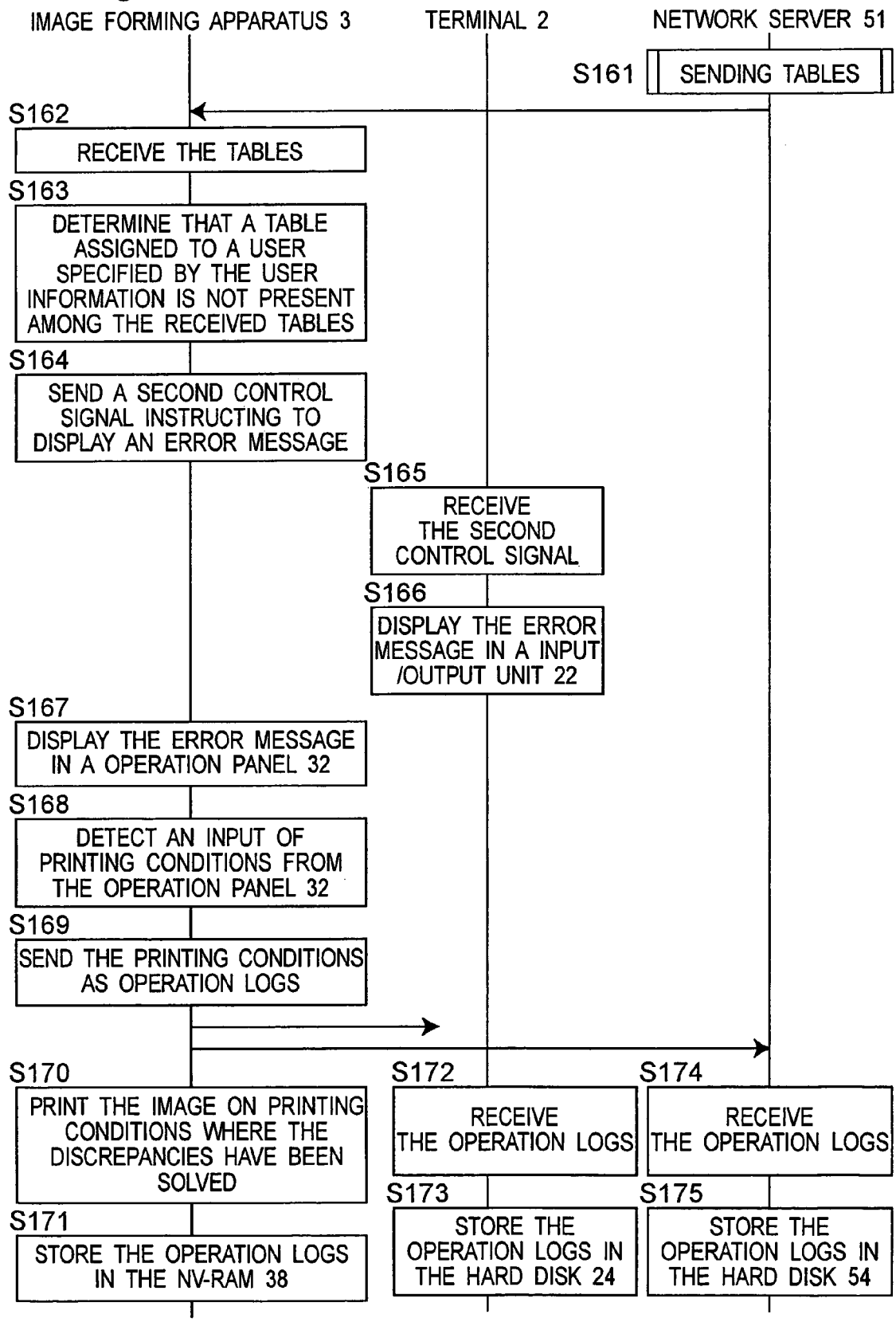
FIG. 18 is an example of each control flow of CPU 23, CPU 33, and CPU 53, when the operation logs is sent from the image forming apparatus 3 to the network server 51.

FIG. 18 is an example of each control flow of CPU 23, CPU 33, and CPU 53, included in the terminal 2, the image forming apparatus 3, and the network server 51, respectively, when the operation logs is sent from the image forming apparatus 3 to the network server 51. In FIG. 18, steps S162 to S173 after the tables is sent from the network server 51 to the image forming apparatus 3 (step S161) are substantially equal to the steps S72 to S83 shown in FIG. 11, and will be explained in no more detail. As shown in FIG. 18, when detecting the input of the user-input printing conditions from the operation panel 32 (step S168), the CPU 33 of the image forming apparatus 3 drives the network interface 31 to send the user-input printing conditions as operation logs to the network server 51 as well as the terminal 2. In turn, the CPU 53 of the network server 51 drives the network interface 52 to receive the operation logs (step S174), and drives the hard disk 54 to store the same therein (step S175).

Figure 19:
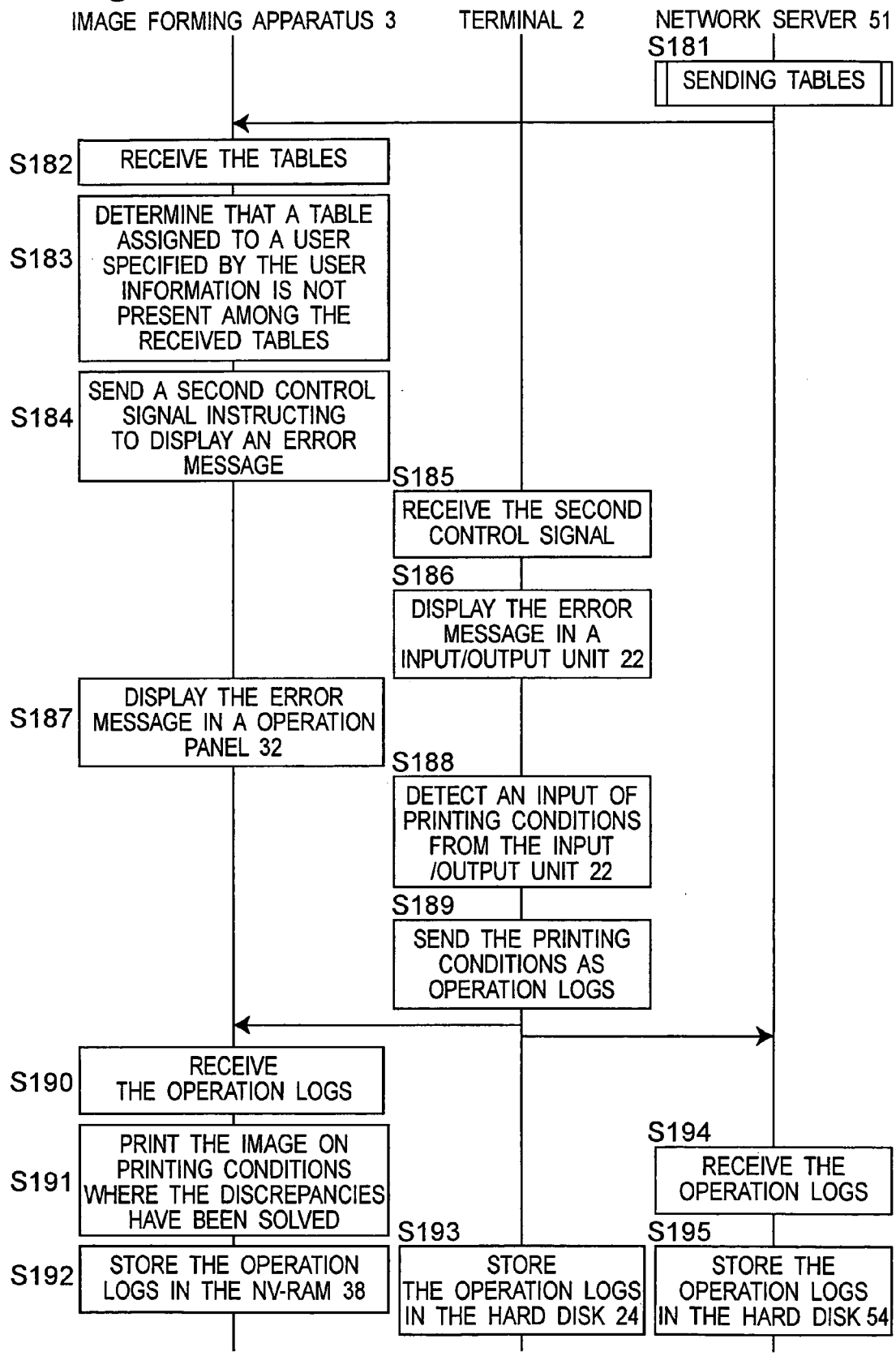
FIG. 19 is an example of each control flow of CPU 23, CPU 33, and CPU 53, when the operation logs are sent from the terminal 2 to the network server 51.

FIG. 19 is an example of each control flow of CPU 23, CPU 33, and CPU 53, included in the terminal 2, the image forming apparatus 3, and the network server 51, respectively, when the operation logs are sent from the terminal 2 to the network server 51. In FIG. 19, steps S182 to S193 after the tables are sent from the network server 51 to the image forming apparatus 3 (step S181) are substantially equal to steps S112 to S123 shown in FIG. 13, and will be explained in no more detail. As shown in FIG. 19, when detecting the input of the printing conditions from the input/output unit 22 (step S188), the CPU 23 of the terminal 2 sends the printing conditions input with the input/output unit 22 as operation logs to the network server 51 as well as the image forming apparatus 3. In turn, the CPU 53 of the network server 51 drives the network interface 52 to receive the operation logs (step S194) and drives the hard disk 54 to store the same therein (step S195).

When the operation logs are stored in the hard disk 54 of the network server 51 as described, the operation logs stored in the hard disk 54 of the network server 51 can equally be accessed from each of one or more image forming apparatuses 3 and one or more terminals 2 connected to the network server 51 as well as the tables.

It will be obvious to those having skill in the art that many changes may be made in the above-described details of the preferred embodiments of the present invention. The scope of the present invention, therefore, should be determined by the following claims.

What is claimed is:

1. An image forming apparatus, connected with terminals via a network, comprising:
 a receiving device which receives an image and first printing conditions for printing the image from a terminal among the terminals via the network;
 a generating device which generates second printing conditions on the basis of said first printing conditions and settings of said image forming apparatus;
 a comparing device which compares said first and second printing conditions to determine whether or not one or more discrepancies occur between said first and second printing conditions;
 a first storage device which stores a table which stores discrepancies to be determined to occur by said comparing device and solutions each of which corresponds to each of said discrepancies;
 a first setting device which automatically sets, by using the table, a solution among the solutions for each of said one or more discrepancies determined to occur by said comparing device; and
 a printing device which prints the image on printing conditions in which said one or more discrepancies are solved by said solution set by said first setting device.

2. The image forming apparatus according to claim 1, wherein said receiving device receives a degree of significance of the image, together with the image and said first printing conditions;
 the table stored in said first storage device stores the solutions for each of degrees of significance of the image; and
 said first setting device automatically sets, by using the table, said solution among the solutions for each of said one or more discrepancies according to the degree of significance of the image received by said receiving device.

3. The image forming apparatus according to claim 2, wherein said first storage device stores a plurality of tables assigned to each of pre-registered users, further comprising a searching device which searches one among a plurality of the tables,
 said receiving device receives information about a user, together with the image, said first printing conditions, and the degree of significance of the image;
 said searching device searches said one among a plurality of the tables assigned to said user the information about which is received by said receiving device; and
 said first setting device automatically sets, by using said one among a plurality of the tables searched by said searching device, said solution among the solutions for each of said one or more discrepancies according to the degree of significance of the image received by said receiving device.

4. The image forming apparatus according to claim 3, further comprising:
 a display device which displays a message indicative of an occurrence of said one or more discrepancies;
 an input device by which a third printing condition for solving said each of said one or more discrepancies is input;
 a second storage device which stores said third printing condition as being related to said each of said one or more discrepancies; and
 a second setting device which sets said third printing condition for said each of said one or more discrepancies, automatically when said searching device does not find any table among the one or more tables assigned to said user the information about which is received by said receiving device, or sets said third printing condition for each of at least one of said one or more discrepancies, automatically when said first setting device does not find any solution for said at least one of said one or more discrepancies, wherein said printing device prints the image on printing conditions in which said one or more discrepancies are solved by said third printing condition set by said second setting device.

5. The image forming apparatus according to claim 4, wherein said display device displays an example of solutions for said each of said one or more discrepancies, together with said message.

6. The image forming apparatus according to claim 4, further comprising a sending device which sends said third printing condition set by said second setting device to said terminal among the terminals via the network.

7. The image forming apparatus according to claim 1, further comprising a selecting device which selects whether or not to make said first setting device operate.

8. An image forming system comprising:
 a terminal; and
 an image forming apparatus connected to said terminal via a network, wherein said terminal comprises a sending device which sends an image and first printing conditions for printing the image to said image forming apparatus via the network;
 said image forming apparatuses comprises:
 a receiving device which receives the image and said first printing conditions from said terminal via the network;
 a generating device which generates second printing conditions on the basis of said first printing conditions and settings of said image forming apparatus;
 a comparing device which compares said first and second printing conditions to determine whether or not one or more discrepancies occur between said first and second printing conditions;

a storage device which stores a table which stores discrepancies to be determined to occur by said comparing device and solutions each of which corresponds to each of said discrepancies;

a setting device which automatically sets, by using the table, a solution among the solutions for each of said one or more discrepancies determined to occur by said comparing device; and a printing device which prints the image on printing conditions in which said one or more discrepancies are solved by said solution set by said first setting device.

9. An image forming method for forming an image at an image forming apparatus connected to terminals via a network, comprising:

storing a table in a storage device which stores discrepancies to occur between two printing conditions set to the image and solutions each of which corresponds to each of said discrepancies;

receiving the image and first printing conditions, which is one of said two printing conditions, from one among the terminals via the network;

generating second printing conditions, which is another of said two printing conditions, on the basis of said first printing conditions and settings of the image forming apparatus;

comparing said first and second printing conditions to determine whether or not one or more discrepancies occur between said first and second printing conditions;

setting automatically, by using the table, a solution among the solutions for each of said one or more discrepancies determined to occur by said comparing device; and printing the image on printing conditions in which said one or more discrepancies are solved by said solution set in said setting step.

10. The image forming method according to claim 9, wherein, in said receiving step, a degree of significance of the image is received, together with the image and said first printing conditions;

in said storing step, said table are stored in the storage device which stores the solutions for each of degrees of significance of the image; and in said setting step, by using the table, said solution among the solutions for each of said one or more discrepancies is automatically set according to the degree of significance of the image received by said receiving device.

11. The image forming method according to claim 10, wherein in said storing step, a plurality of tables assigned to each of pre-registered users are stored in the storage device, further comprising searching one among a plurality of the tables;

in said receiving step, information about a user is received, together with the image, said first printing conditions, and the degree of significance of the image;

in said searching step, said one among a plurality of the tables assigned to said user the information about which is received in said receiving step is searched; and in said setting step, by using said one among a plurality of the tables searched by said searching device, said solution among the solutions for each of said one or more discrepancies is automatically set according to the degree of significance of the image received by said receiving device.

12. A program executed by an image forming apparatus for forming an image comprising:

storing a table in a storage device which stores discrepancies to occur between two printing conditions set to the image and solutions each of which corresponds to each of said discrepancies;

receiving the image and first printing conditions, which is one of said two printing conditions, from one among the terminals via the network;

generating second printing conditions, which is another of said two printing conditions, on the basis of said first printing conditions and settings of the image forming apparatus;

comparing said first and second printing conditions to determine whether or not one or more discrepancies occur between said first and second printing conditions;

setting automatically, by using the table, a solution among the solutions for each of said one or more discrepancies determined to occur by said comparing device; and printing the image on printing conditions in which said one or more discrepancies are solved by said solution set in said setting step.

13. The program according to claim 12, wherein, in said receiving step, a degree of significance of the image is received, together with the image and said first printing conditions;

in said storing step, said table are stored in the storage device which stores the solutions for each of degrees of significance of the image; and in said setting step, by using the table, said solution among the solutions for each of said one or more discrepancies is automatically set according to the degree of significance of the image received by said receiving device.

14. The program according to claim 13, wherein, in said storing step, a plurality of tables assigned to each of pre-registered users are stored in the storage device, further comprising searching one among a plurality of the tables;

in said receiving step, information about a user is received, together with the image, said first printing conditions, and the degree of significance of the image;

in said searching step, said one among a plurality of the tables assigned to said user the information about which is received in said receiving step is searched; and in said setting step, by using said one among a plurality of the tables searched by said searching device, said solution among the solutions for each of said one or more discrepancies is automatically set according to the degree of significance of the image received by said receiving device.

15. A computer-readable storage medium which storages a program executed by an image forming apparatus for forming an image comprising:

storing a table in a storage device which stores discrepancies to occur between two printing conditions set to the image and solutions each of which corresponds to each of said discrepancies;

receiving the image and first printing conditions, which is one of said two printing conditions, from one among the terminals via the network;

generating second printing conditions, which is another of said two printing conditions, on the basis of said first printing conditions and settings of the image forming apparatus;

comparing said first and second printing conditions to determine whether or not one or more discrepancies occur between said first and second printing conditions;

setting automatically, by using the table, a solution among the solutions for each of said one or more discrepancies determined to occur by said comparing device; and printing the image on printing conditions in which said one or more discrepancies are solved by said solution set in said setting step.

16. The computer-readable storage medium according to 15, wherein in said receiving step, a degree of significance of the image is received, together with the image and said first printing conditions;

in said storing step, said table are stored in the storage device which stores the solutions for each of degrees of significance of the image; and in said setting step, by using the table, said solution among the solutions for each of said one or more discrepancies is automatically set according to the degree of significance of the image received by said receiving device.

17. The computer-readable storage medium according to claim 16, wherein in said storing step, a plurality of tables assigned to each of pre-registered users are stored in the storage device, said program further comprising searching one among a plurality of the tables;

in said receiving step, information about a user is received, together with the image, said first printing conditions, and the degree of significance of the image;

in said searching step, said one among a plurality of the tables assigned to said user the information about which is received in said receiving step is searched; and in said setting step, by using said one among a plurality of the tables searched by said searching device, said solution among the solutions for each of said one or more discrepancies is automatically set according to the degree of significance of the image received by said receiving device.

18. An image forming system comprising:

a terminal; and an image forming apparatuses connected to said terminal via a network, wherein said terminal comprises:

a first sending device which sends an image and first printing conditions for printing the image to said image forming apparatus via the network; and a storage device which stores a table which stores discrepancies to occur between said first printing conditions and second printing conditions, generated by said image forming apparatus on the basis of said first printing conditions and settings of said image forming apparatus, and solutions each of which corresponds to each of said discrepancies; and a first receiving device which receives a predetermined control signal from said image forming apparatus via the network; wherein said first sending device sends the table to said image forming apparatus, when said first receiving device receives said predetermined control signal; and said image forming apparatus comprises:

a second receiving device which receives the image, said first printing conditions, and the table from said terminal via the network;

a generating device which generates said second printing conditions on the basis of said first printing conditions and the settings of said image forming apparatus;

a comparing device which compares said first and second printing conditions to determine whether or not one or more discrepancies occur between said first and second printing conditions;

a second sending device which sends said predetermined control signal to said terminal, when said one or more discrepancies are determined to occur;

a setting device which automatically sets, by using the table, a solution among the solutions for each of said one or more discrepancies determined to occur by said comparing device; and a printing device which prints the image on printing conditions in which said one or more discrepancies are solved by said solution set by said setting device.

19. An image forming system comprising;

a terminal;

an image forming apparatus; and a server apparatus; wherein said terminal, said image forming apparatus, and said server apparatus are connected to each other via a network, said server apparatus comprises:

a storage device which stores a table which stores discrepancies to occur between first printing conditions for printing a image, set by said terminal, and second printing conditions, generated by said image forming apparatus on the basis of said first printing conditions and settings of said image forming apparatus;

a first receiving device which receives a predetermined control signal from said image forming apparatus via the network; and a first sending device which sends the table to said image forming apparatuses, when said first receiving device receives said predetermined control signal; and said terminal comprises:

a second sending device which sends the image and said first printing conditions for printing the image to said image forming apparatuses;

said image forming apparatus comprises:

a second receiving device which receives the image, said first printing conditions from said terminal, and said table from said server apparatus via the network;

a generating device which generates said second printing conditions on the basis of said first printing conditions and settings of said image forming apparatus;

a comparing device which compares said first and second printing conditions to determine whether or not one or more discrepancies occur between said first and second printing conditions;

a third sending device which sends said predetermined control signal to said server apparatus, when said one or more discrepancies are determined to occur;

a setting device which sets, by using the table received by said second receiving device, a solution among the solutions for each of said one or more discrepanicies determined to occur by said comparing device; and a printing device which prints the image on printing conditions in which said one or more discrepancies are solved by said solution set by said setting device.

* * * * *